US010442506B2

(12) United States Patent
Zhou

(10) Patent No.: US 10,442,506 B2
(45) Date of Patent: Oct. 15, 2019

(54) UNIVERSAL OFFSHORE PLATFORM, AND BUOYANCY REGULATION METHOD AND STABLE POWER GENERATION METHOD THEREOF

(71) Applicant: Jianhui Zhou, Quanzhou (CN)

(72) Inventor: Jianhui Zhou, Quanzhou (CN)

(73) Assignee: QUANZHOU DINGWEI CONSTRUCTION TECHNOLOGY CO., LTD, Quanzhou (CN)

(*) Notice: Subject to any disclaimer, the term of this patent is extended or adjusted under 35 U.S.C. 154(b) by 60 days.

(21) Appl. No.: 15/873,869

(22) Filed: Jan. 17, 2018

(65) Prior Publication Data
US 2018/0141622 A1 May 24, 2018

Related U.S. Application Data

(63) Continuation of application No. PCT/CN2016/087050, filed on Jun. 24, 2016.

(30) Foreign Application Priority Data

Jul. 6, 2015 (CN) .......................... 2015 1 0399985
Apr. 25, 2016 (CN) .......................... 2016 1 0261520

(51) Int. Cl.
*B63B 35/00* (2006.01)
*B63B 35/44* (2006.01)
*B63B 43/12* (2006.01)

(52) U.S. Cl.
CPC ............. *B63B 35/44* (2013.01); *B63B 43/12* (2013.01); *B63B 2035/4466* (2013.01); *B63B 2207/02* (2013.01); *Y02E 10/38* (2013.01)

(58) Field of Classification Search
CPC ..... B63B 35/44; B63B 43/12; B63B 2207/02; B63B 2035/4466; Y02E 10/38
USPC ..... 405/196, 200, 205, 210; 114/256; 220/8, 220/435, 436; 62/45
See application file for complete search history.

(56) References Cited

U.S. PATENT DOCUMENTS 2,955,626 A * 10/1960 Hartley ................. B63B 22/023
141/279
2,988,144 A * 6/1961 Conrad ..................... E21B 7/12
166/352
3,424,241 A * 1/1969 Triplett ................... E21B 7/128
166/340

(Continued)

*Primary Examiner* — Benjamin F Fiorello
*Assistant Examiner* — Edwin J Toledo-Duran
(74) *Attorney, Agent, or Firm* — Wayne & Ken, LLC; Tony Hom

(57) ABSTRACT

The invention discloses a universal offshore platform. The platform includes a truss body forming the support system of the platform. the truss body is a three-dimensional stable rigid support and comprises an underwater surface layer, a water surface layer and an overwater surface layer from bottom to top. It comprises a first floating body component, a second floating body component and several sporadic single floating bodies. The universal offshore platform of the present invention can be used independently, be used as a constitutional unit of a marine base and is less adversely affected by the wave motion. A buoyancy regulation method based on a universal offshore platform ensures stability of the platform and a power generation system based on the universal offshore platform takes full advantage of the energy of the waves to generate electricity.

15 Claims, 19 Drawing Sheets

(56) References Cited

U.S. PATENT DOCUMENTS

| | | | | |
|---|---|---|---|---|
| 3,572,041 | A * | 3/1971 | Graaf | B63B 9/065 405/205 |
| 3,610,194 | A * | 10/1971 | Siegel | B65D 88/78 114/257 |
| 3,643,447 | A * | 2/1972 | Pogonowski | B65D 88/78 405/210 |
| 3,797,256 | A * | 3/1974 | Giblon | B63B 35/4413 405/196 |
| 3,870,003 | A * | 3/1975 | Mo | B63B 35/4413 405/203 |
| 4,004,531 | A * | 1/1977 | Mott | B63B 27/36 114/256 |
| 4,121,529 | A * | 10/1978 | Smith | F16L 1/163 114/267 |
| 4,232,983 | A * | 11/1980 | Cook | B63B 25/08 114/257 |
| 4,302,291 | A * | 11/1981 | Severs | G21C 13/00 376/293 |
| 4,365,576 | A * | 12/1982 | Cook | B63B 35/44 114/257 |
| 4,398,095 | A * | 8/1983 | Ono | F03B 13/189 290/53 |
| 4,603,551 | A * | 8/1986 | Wood | B01D 61/10 417/333 |
| 4,742,241 | A * | 5/1988 | Melvin | F03B 13/187 290/42 |
| 4,762,180 | A * | 8/1988 | Wybro | E21B 7/128 166/350 |
| 5,094,595 | A * | 3/1992 | Labrador | B01D 61/10 417/332 |
| 5,117,914 | A * | 6/1992 | Blandford | E21B 43/017 166/344 |
| 5,324,988 | A * | 6/1994 | Newman | F03B 13/148 290/45 |
| 5,411,377 | A * | 5/1995 | Houser | F03B 13/1855 417/333 |
| 5,433,273 | A * | 7/1995 | Blandford | B63B 21/502 166/344 |
| 5,507,943 | A * | 4/1996 | Labrador | B01D 61/10 210/136 |
| 5,872,406 | A * | 2/1999 | Ullman | F03B 13/26 290/42 |
| 6,768,217 | B2 * | 7/2004 | Chalmers | F03B 13/148 290/53 |
| 7,163,355 | B2 * | 1/2007 | Ingle | E02B 17/021 405/196 |
| 7,234,409 | B2 * | 6/2007 | Hansen | B63B 25/002 114/258 |
| 7,553,106 | B2 * | 6/2009 | Horton, III | B63B 9/065 114/264 |
| 7,877,994 | B2 * | 2/2011 | Bull | B63B 35/4406 60/495 |
| 7,886,829 | B2 * | 2/2011 | Edwards | B63B 22/24 166/344 |
| 7,978,806 | B1 * | 7/2011 | Hayman, III | G21C 13/00 376/317 |
| 8,292,546 | B2 * | 10/2012 | Wu | B65D 88/78 405/210 |
| 8,618,686 | B2 * | 12/2013 | Jo | F03B 13/20 290/53 |
| 8,905,678 | B2 * | 12/2014 | Loladze | B63B 38/00 405/210 |
| 8,912,677 | B2 * | 12/2014 | Dehlsen | E02B 9/08 290/53 |
| 8,915,677 | B2 * | 12/2014 | Lenders | B63B 35/4413 405/196 |
| 2004/0141811 | A1 * | 7/2004 | Karal | B63B 22/00 405/200 |
| 2006/0225633 | A1 * | 10/2006 | Samuelsen | B65D 88/78 114/256 |
| 2008/0018114 | A1 * | 1/2008 | Weldon | F03B 13/181 290/53 |
| 2008/0088133 | A1 * | 4/2008 | Nagata | F03B 13/142 290/53 |
| 2009/0091135 | A1 * | 4/2009 | Janca | F03B 13/10 290/54 |
| 2011/0030365 | A1 * | 2/2011 | Gilboa | F03B 17/025 60/497 |
| 2013/0199182 | A1 * | 8/2013 | Shifferaw | F03G 7/04 60/641.2 |
| 2015/0346726 | A1 * | 12/2015 | Davoodi | B63B 22/24 701/21 |
| 2018/0058420 | A1 * | 3/2018 | Moffat | F03B 11/02 |

* cited by examiner

A-A

B-B

C-C

UNIVERSAL OFFSHORE PLATFORM, AND BUOYANCY REGULATION METHOD AND STABLE POWER GENERATION METHOD THEREOF

FIELD OF THE INVENTION

The present invention relates to a universal offshore platform and buoyancy regulation method and stable power generation method.

BACKGROUND OF THE INVENTION

For a long time, the activities of human in the sea have relied on ships or various platforms similar to ships, their drainage space of buoyancy-receiving is usually a continuous rigid body, and a large part of the drainage volume is in the wave activity area. The obtained buoyancy of the hull is in dynamic change by changing the draining water quantity of draining body during the wave motion to force the hull to keep moving up and down, the larger the size of the ship, the greater the change in the stress load on the hull, under extreme weather conditions, this harmful stress load increases geometrically. Therefore, in the process of design and manufacture of the ship, the formed confined space of the drainage body are demanded extremely high, the confined space should be no defect, no weakness, and should have sufficient strength, a large part of the structure materials of the hull are increased to cope with wind and waves and to protect the structural strength of the hull, however, the added material increases the weight of the structure as well as its own weight, afterwards, a larger drainage volume is needed, and this it forms a vicious cycle, as a result, the traditional ships or various types of ship-like platforms require high manufacturing technology, large amount of materials, and the effectively available space is expensive.

SUMMARY OF THE INVENTION

The object of the present invention is to provide an universal offshore platform which can be used independently and also be used as a component unit of an ultra-large-scale offshore base and a maritime city. And it is adversely affected by the movement of the ocean waves in a small size and the structural body is under various sea conditions, and internal stress changes little or is controllable.

Another object of the present invention is to provide a buoyancy regulation method based on the universal offshore platform, which can flexibly adjust the buoyancy configuration to fully ensure the stability of the platform according to load fluctuation borne by the platform through the inter-related coordination and regulation of each structure.

A further object of the present invention is to provide a stable power generation system based on the universal offshore platform, which can make full use of sea waves to generate electricity and can greatly reduce the cost normally used on the universal offshore platform.

The objects of the present invention are achieved by the following technical solutions:

A universal offshore platform, comprising a truss body that forms the supporting system of the platform; the truss body is a three-dimensional stable rigid support formed by the long rod and comprises underwater layer, water surface layer, overwater surface layer; the truss body comprises a first floating body component that is fixed to the underwater layer layer and provides more than 90% buoyancy force for the platform, a second floating body component arranged in the water surface layer and connected to the truss body through a vibration damping structure and cooperating with the first floating body component to ensure that the platform is floating, and some sporadic single floating bodies suspended on the water when cans are empty; the sporadic single floating bodies can be continuously discharged into water when stored, and can be fixed in the underwater layer to serve as a first single floating body; the first floating body component comprises a plurality of first single floating bodies located submerged, the second floating body component comprises a plurality of second single floating bodies located in the water surface layer, the second floating body component also comprises draining floating bodies and each of the draining floating bodies pulls more than three vibration damping structures.

A buoyancy regulation method of the universal offshore platform comprises the following steps:

the first anti-pressure tank of each of the first single floating bodies stores water, the public high-pressure water pipe make the first anti-pressure tanks connected to each other, the high-pressure air source charges the first anti-pressure tanks with high-pressure air and balances the pressure in each other through the public high-pressure air pipe, so that each of the first anti-pressures tanks have the same amount of water to obtain buoyancy balance;

when the number of first single floating bodies fixed on the underwater layer remains constant, the sporadic floating body is used as a water storage tank, the water is introduced from the first anti-pressure tank into the water storage tank, as the amount of water entering the storage tank increases, the gravity of the water storage tank can be balanced by the gradual lowering of the water storage tank into the water, the platform buoyancy increases; the water in the water storage tank is pressured into the public low-pressure water pipe by using high-pressure air, at the same time the power generation of the turbine generator is reduced, and water in the water storage tank is introduced into the first anti-pressure tank; as the amount of water in the water storage tank decreases and the water storage tank is gradually lifted until it returns to the overwater level and returns to a sporadic single floating body, the buoyancy of the platform is reduced.

When the number of first floating bodies fixed in the underwater layer is changed, sporadic floating bodies are used as added first single floating bodies, after the added first single floating bodies are stored with water and the added first single floating bodies are put to the underwater layer, so that the first single floating bodies are at the same level with the added first single floating bodies, and the added first single floating bodies are fixedly connected in the same way that the first single floating bodies are connected in, then high-pressure air is supplied to the added first anti-pressure tanks of the added first single floating bodies to decrease water quantity, when the required buoyancy of the added first anti-pressure tanks is achieved, high-pressure air is stopped to supply, the air pressure of the added first anti-pressure tanks is adjusted to balance with the air pressure of each of the first anti-pressure tanks, and communicate with each other, and the buoyancy of the platform increases; when the selected first single floating bodies are reduced the pressure and added with water and relieved the connection with the underwater layer as water storage tanks, and then high-pressure air are pumped into the water storage tanks.

The stable power generation method of the universal offshore platform comprises the following steps:

by the pressure value of high-pressure air in the added first floating body component and the public high-pressure air pipe, the minimum output pressure value of the vibration damping structure is determined to control and maintain the stability of the high-pressure air pressure in the public high-pressure air pipe and the first floating body component; according to the water flow pumped to the public high water pipe by vibration damping structure or the air flow pumped to the public high air pipe by vibration damping structure, turning on the corresponding number and power of hydraulic generators or air expansion generators/screw expansion generators, matching the water flow or air flow for generating electricity with the water flow or air flow pressed in by the vibration damping structure, at the same time ensuring the balance of water circulation flow of the public high water pipe and the public low water pipe, and ensuring that the high-pressure air pressure in the first floating body component and the public high-pressure air pipe is stable at the set value.

Compared with the prior art, the present invention has the following advantages:

(1) through the buoy components arranged in different positions, the wave motion can not change the displacement volume of the platform voluntarily, it greatly reduces the influence of the platform by the wave motion. The platform is relatively stable at sea, and the load stress of the platform is little changed;

(2) the air pressure in the first floating body component is used to adjust the water level in the first floating body component so that the platform can conveniently adjust the buoyancy of the first floating body component according to the different load;

(3) the vibration damping structure is used rationally, the wave energy is collected and transformed effectively;

(4) the sporadic single floating body is set as backup structure facilitates so that it is convenient for storing water and increasing the number of first single floating bodies;

(5) the collected wave energy is used to generate electricity efficiently, meanwhile the equipment is protected from damage during pressure transformation.

(6) the platform is stable in the shallow sea area through the anchor assembly, and the chain length is timely adjusted according to the ebb and flow so that the platform can better collect the wave energy;

(7) the buoyancy regulation method based on the universal offshore platform can flexibly adjust the buoyancy configuration to fully ensure the stability of the platform according to load fluctuation borne by the platform through the inter-related coordination and regulation of each structure;

(8) the stable power generation system based on an universal offshore platform can make full use of sea waves to generate electricity and can greatly reduce the cost normally used on the universal offshore platform.

In figures, 01—truss body; 011—underwater layer; 012—water surface layer; 013—overwater surface; 014—communicating rod; 015—flat connecting rod; 016—bevel connecting rod; 017—columnar cavity A; 018—columnar cavity B; 02—first floating body component; 021—first single floating body; 0211—first anti-pressure tank; 0212—first inlet and outlet water pipe; 0213—first inlet and outlet air pipe; 0214—first water level sensor; 0215—first air pressure sensor; 0216—structural connecting rod; 0217—external connecting seat; 02171—joint; 0218—fixing rope or chain; 022—guide pulley; 03—second floating body component; 031—second single floating body; 0311—draining floating body; 0312—connecting joint; 03121—connector; 03122—terminal pad; 03123—universal joint; 0313—fixed pulley; 0314—steel rope member; 04—public high-pressure air pipe; 05—control valve; 06—pressure relief valve; 07—vibration damping structure; 071—straight reciprocating dual-purpose pump; 0711—three-way control valve A; 0712—three-way control valve B; 072—straight reciprocating water pump; 073—straight reciprocating air pump; 08—public high-pressure water pipe; 09—public low-pressure water pipe; 10—sporadic single floating body; 101—sporadic anti-pressure tank; 102—lifting equipment; 103—sporadic inlet and outlet water pipe; 104—sporadic inlet and outlet air pipe; 105—sporadic water level sensor; 106—sporadic air pressure sensor; 11—hydraulic generator; 12—air expansion generator or screw expansion generator; 131—submarine pile; 132—winch; 133—anchoring chain; 14—air reserving component; 141—air storage tank; 142—air compressor; 143—air conduit; 144—air reserving pressure sensor; 15—living cabin; 16—important equipment cargo hold; 1601—piston rod; 1602—spring shield; 1603—reset spring; 1604—spring seat; 1605—piston rod positioning guide wheel; 1606—pull rod seat; 1607—pull rod; 1608—piston; 1609—compressor cylinder; 1610—water inlet and outlet pipe; 1611—pulley; 1612—disc; 1613—force axle; 1614—external truss connecting rod; 1615—piston rod positioning seat frame; 1616—cylinder mounting connecting rod; 1617—rod joint; 1618—electric hydraulic pump; 1619—spring lifting plug; 1620—hydraulic lifting rod; 1621—connecting rod; 1622—connecting plate; 1624—one way valve; 1625—high-pressure outlet pipe; 1626—low-pressure inlet pipe; 1627—upper plane plate;

1628—lower plane plate; 17—Piston rod positioning seat; 18—cylinder mounting seat; 19—spring controller.

DETAILED DESCRIPTION OF THE INVENTION

The content of the present invention is described in detail below with reference to the accompanying drawings and embodiments.

Embodiment 1

As shown in FIG. 1 to FIG. 17, a schematic diagram of the implementation of a common offshore platform provided by the invention is presented.

Figure 1:
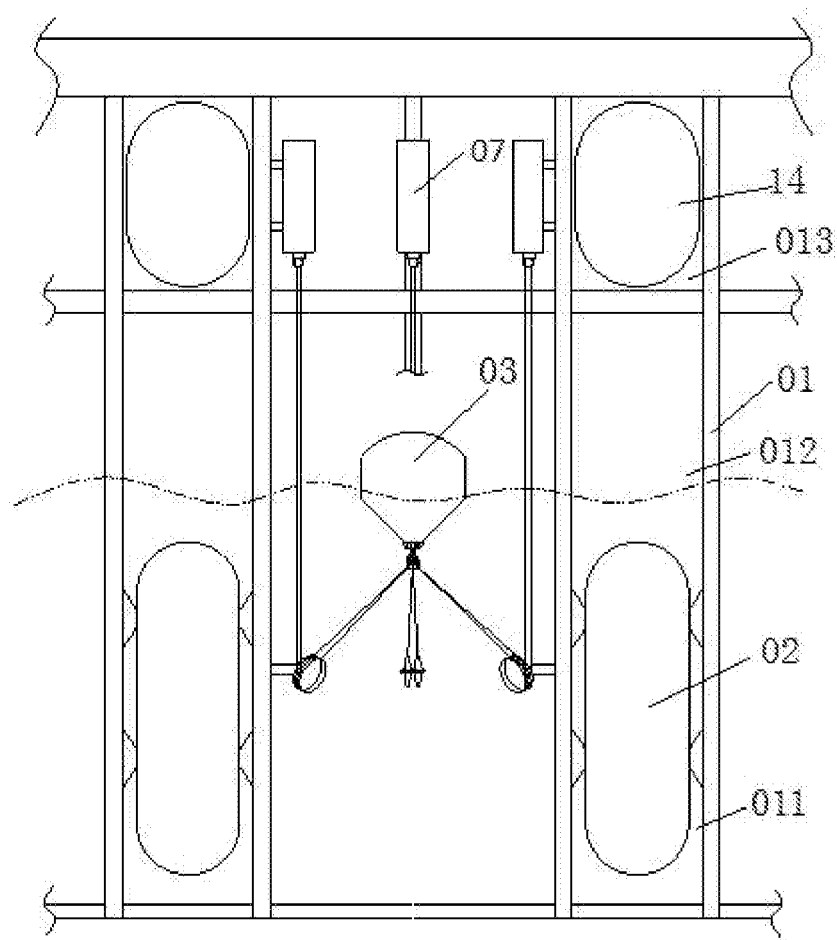
FIG. 1 is a simplified structural view of an embodiment of the present invention.
Figure 2:
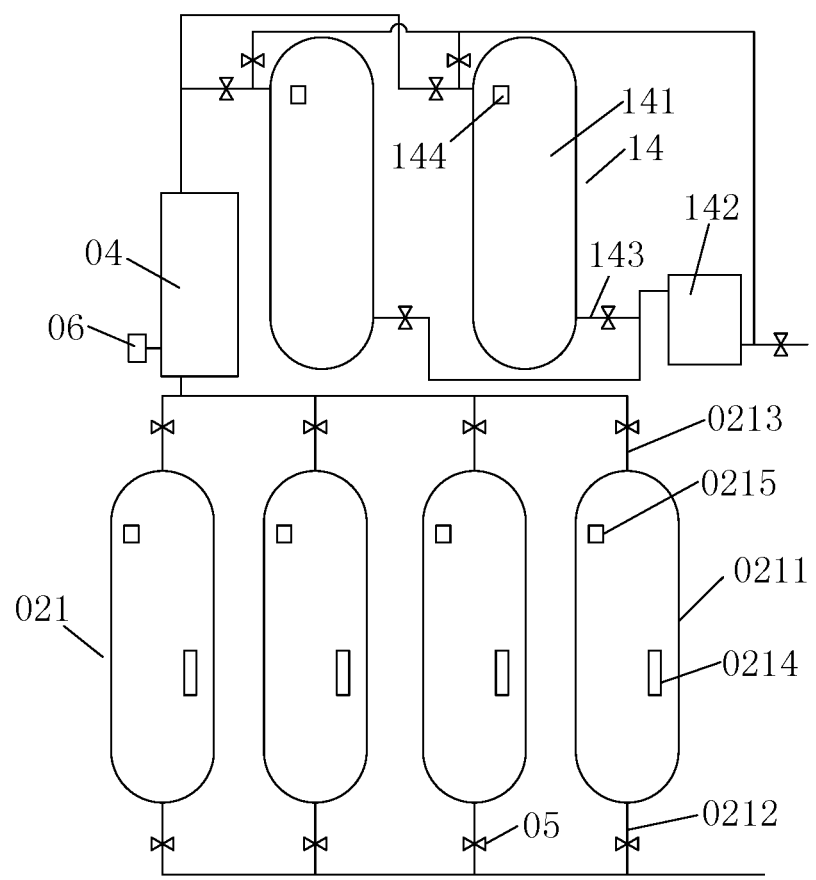
FIG. 2 is a connection schematic view between the first floating body assembly and the gas storage assembly in the embodiment.
Figure 3:
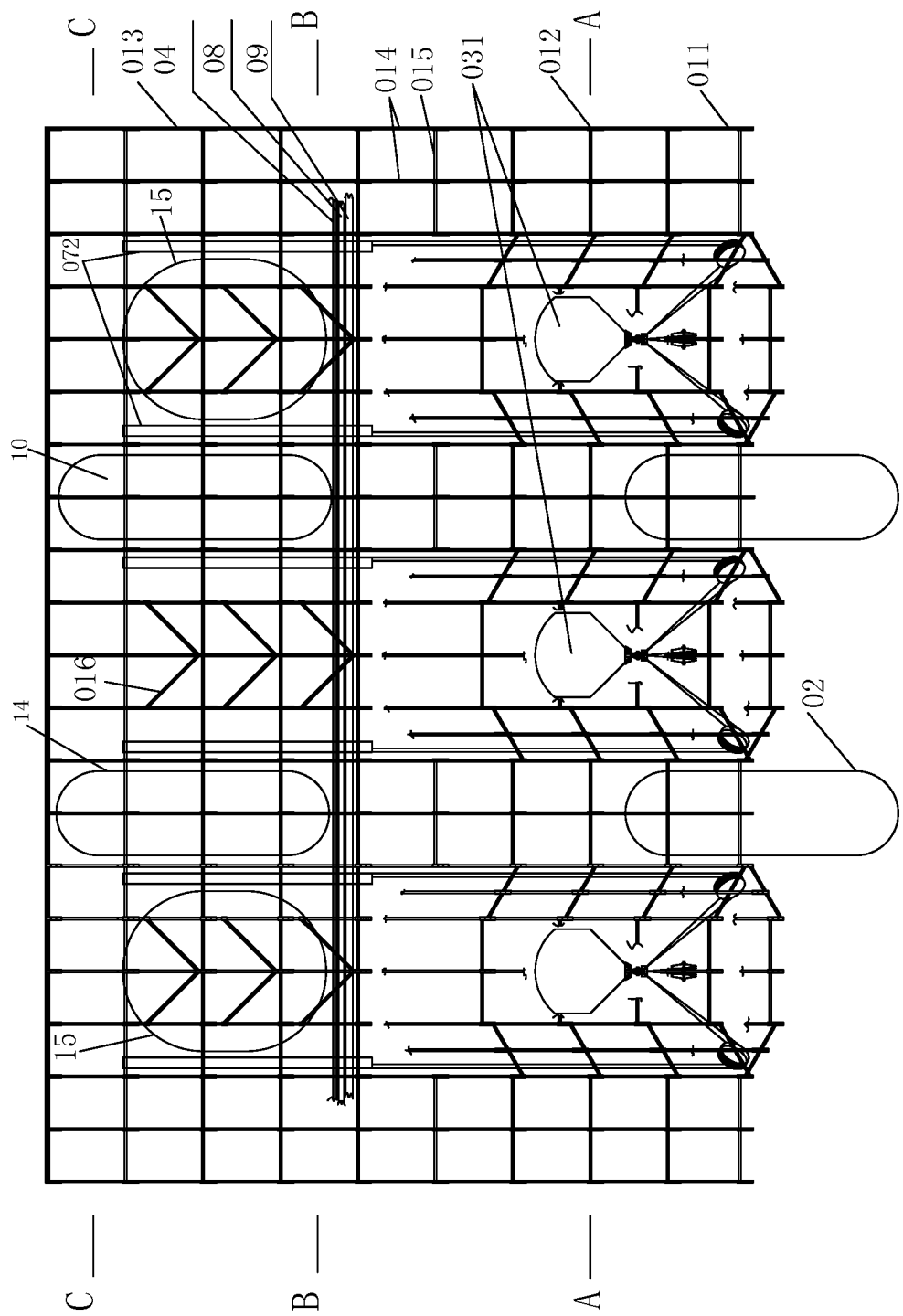
FIG. 3 is another simplified structural view of an embodiment of the present invention.

FIG. 1 and FIG. 2 show a universal offshore platform, and the universal offshore platform comprises a truss body (01) forming a supporting system of the platform; the truss body (01) comprises three-layers structure: a underwater layer (011), a water surface layer (012) and an overwater water (013); the underwater layer is the underwater part of the truss body, the water surface is the part of the truss body in the wave activity area of the water surface, and the overwater layer is the part of the truss body above the water surface of the water wave action area; the truss body further comprises a first floating body component (02) that is fixed to the underwater layer layer (011) and provides more than 90% buoyancy force for the platform, a second floating body component (03) arranged in the water surface layer (012) and connected to the truss body through the vibration vibration damping structure (07) and cooperating with the first floating body component to ensure that the platform floats is floating.

In a preferred solution, as shown in FIG. 2, the universal offshore platform further comprises an air reserving component 14, the air reserving component comprises several air reserving tanks and more than one air compressors connected with air reserving tanks; the air inlet of the air reserving tank is connected with the air outlet of the air compressor by air pipe with valves. The air reserving component is provided in the overwater layer. Air reserving tanks can be directly connected to each other by air pipes with valves, air reserving tanks are connected with other air source or the devices required gas supply by air pipes with valves; further, the structure and specifications of the air reserving tank are basically similar to those of the first single floating body, so that anti-pressure capacity strengthen appropriately, air reserving tanks are placed upside down in the cavity of the overwater layer of the first single floating body, equivalently, the first inlet and outlet water pipe of the first single floating body is as a inlet and outlet air pipe to connected with the air compressor herein, the inlet and outlet air pipe of the air reserving tank is connected with the public high air pipe; the air reserving tank is fixedly connected with the truss body. The air reserving component can select multiple first single floating bodies, and the communicating pipes used for connecting the first inlet and outlet water pipes of the selected first single floating bodies and the public high-pressure water pipe are closed, the first inlet and outlet air pipes are communicated with the public high-pressure air pipes, the air pressure of the backup high air pressure is higher than that in the first floating body.

The universal offshore platform further comprises a public high-pressure air pipe (04), the public high-pressure air pipe (04) is connected with a high-pressure air source through a control valve (05), the public high-pressure air pipe (04) is provided with a pressure relief valve (06); the first single floating body (021) comprises a first anti-pressure tank (0211), a first inlet and outlet water pipe (0212) and a first inlet and outlet gas pipe (0213) communicated with the first anti-pressure tank (0211), the first inlet and outlet water pipe (0212) is communicated with the bottom of the first anti-pressure tank (0211), the first inlet and outlet air pipe (0213) is communicated with the top of the first anti-pressure tank (0211), and the first single floating body (021) also comprises a first water level sensor (0214) provided in the first anti-pressure tank (0211) and a first air pressure sensor (0215) provided on the top of the first anti-pressure tank (0211), the first inlet and outlet water pipe (0212) is connected with a water source through a control valve (05), the first inlet and outlet air pipe (0212) is connected with the public high-pressure air pipe (04) through a control valve (05).

As shown in FIG. 3 and FIG. 10 to FIG. 13, the truss body (01) is a three-dimensional stable rigid support body which is formed by a strip-shaped rod connected to each other, the horizontal projection of the truss body (01) is a regular hexagonal honeycomb structure with a regular triangular grid as a wall thickness; the truss body (01) comprises a communicating rod (014) vertically disposed and horizontally projections forming nodes of the regular triangular grid, a flat connecting rod (015) horizontally disposed and horizontally projections forming sides of the regular triangular grid, and a bevel connecting rod (016) obliquely connected between two communicating rods (014), the flat connecting rods (015) form a plurality of layers of regular triangle grids; the horizontal projection of the water surface layer (012) is formed by two regular hexagons with different dimensions and specifications separated by a regular triangle grid; each large regular hexagon is adjacent to a plurality of small regular hexagons through regular triangle grids. The sides of the small regular hexagons are equal to the sides of the equilateral triangles, and the sides of the large regular hexagon are double to that of the regular triangles; the small size regular hexagon is the horizontal projection of a columnar cavity A (017), the columnar cavity A (017) is communicated from the underwater layer (011) to the overwater layer (013); the large size regular hexagon is the horizontal projection of a columnar cavity B (018).

Figure 4:
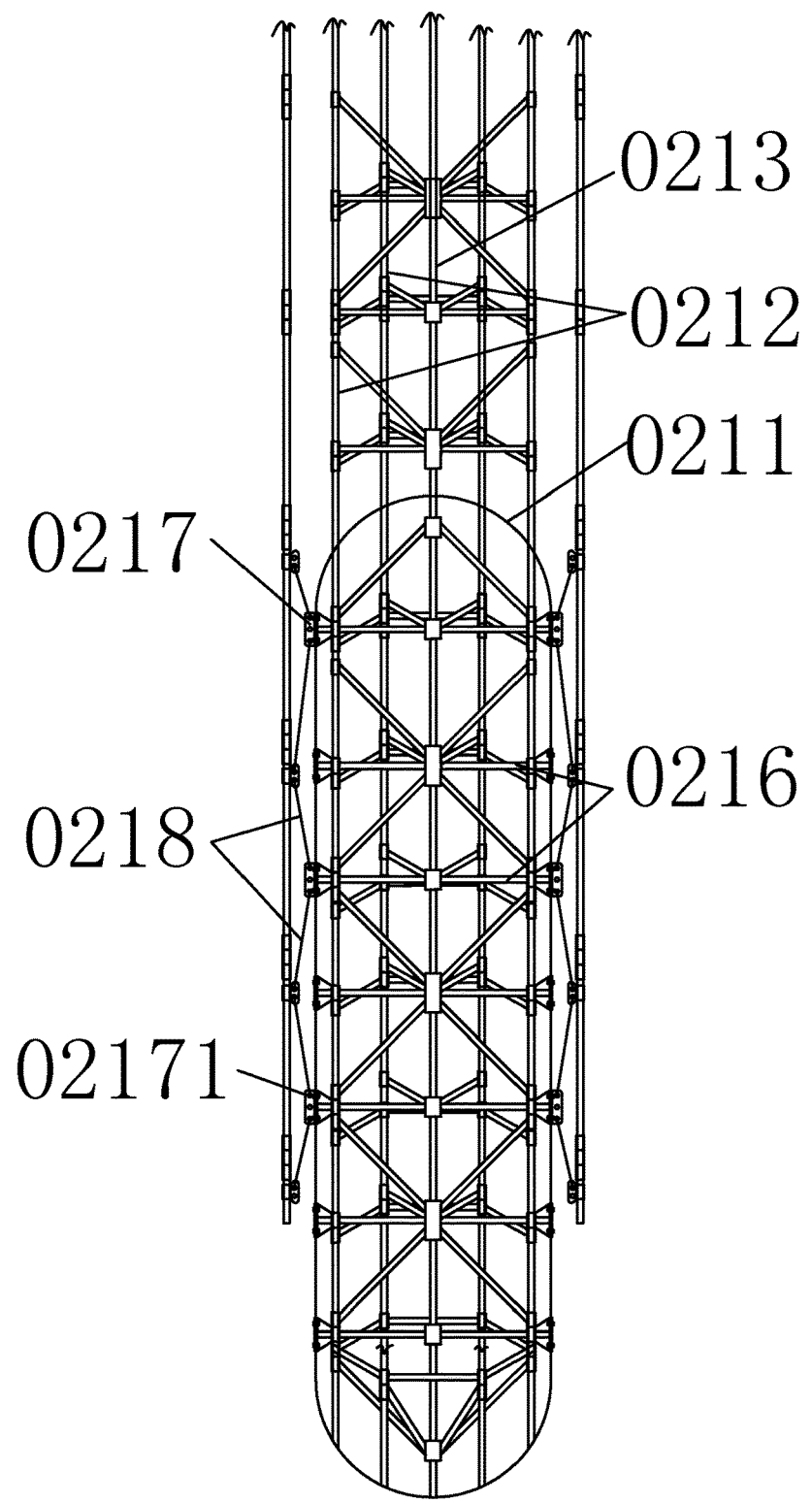
FIG. 4 is a section view of a first single floating body in an embodiment of the present invention.

As shown in FIG. 4, the first single floating body (021) is arranged in the columnar cavity A (017); the first single floating body (021) further comprises a structural connecting rod (0216) and an external connecting seat (0217); the first inlet and outlet water pipe (0212) and the first inlet and outlet air pipe (0213) vertically penetrate from the top of the first anti-pressure tank (0211) and extend to the bottom of the first anti-pressure tank (0211); the first inlet and outlet water pipe (0212), the first inlet and outlet air pipe (0213) and the structural connecting rod (0216) form a stand for strengthening the structural strength of the first anti-pressure tank (0211) in the first anti-pressure tank (0211); the stand is fixedly connected with the inner wall of the first anti-pressure tank (0211); the outer wall of the first anti-pressure tank body is provided with an external connecting seat (0217), each external connecting seat (0217) is connected with a pair of fixing ropes or chains (0218) connected with the truss body (01) and extending upwards and downwards, respectively; the external connecting seat (0217) is provided with a joint (02171) which can be connected with a fixing rope or a chain (0218).

Further, the exterior outline of the horizontal projection of the frame body is regular hexagon, and the interior is divided into six regular triangles, the multiple structural connecting rods located in different horizontal planes form more than two layers of the horizontal connecting structures of the frame body, every layer of horizontal connecting structure is contacted and relied on the inner wall of the first anti-pressure tank (0211) through the structural connecting rods horizontally disposed and fixed with a reinforcing plate on the external end, the reinforcing plate is fixedly and hermetically connected with the external connecting seat by the screw connecting structure provided on the first anti-pressure tank.

Figure 5:
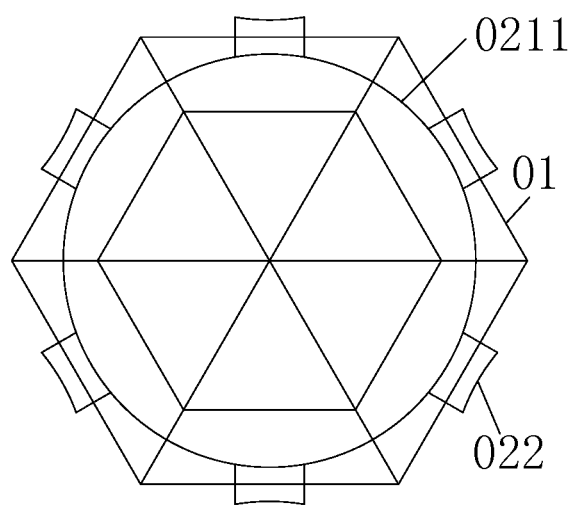
FIG. 5 is a top view of FIG. 4.

In a preferred solution, as shown in FIGS. 4 and 5, the first anti-pressure tank (0211) is a sealed anti-pressure long cylindrical container; seven nodes forming the horizontal projection of the support are composed of seven pipes with enough strength and compression capacity, the first inlet and outlet water pipe (0212) and the first inlet and outlet air pipe (0213) are introduced from the top (end) into the the first anti-pressure tank (0211) and connected with the inner wall on the bottom of the first anti-pressure tank (0211); wherein six through pipes are first inlet and outlet water pipes (0212), and formed to the six nodes of the regular hexagon, the first inlet and outlet water pipes are communicated to the bottom (the other end) of the first anti-pressure tank, and the remained through pipe is a first inlet and outlet air pipe (0213) and located in the center of the distribution of the regular hexagon, and communicated to the bottom of the first anti-pressure tank; and multiple air vents are provided on the upper part in the first anti-pressure tank; twelve structural connecting rods are formed each side of horizontal projection of the frame and extended and connected to the entrance pipes, every twelve structural connecting rods are formed a layer of horizontal connecting structure of the frame body, and more than two layers of horizontal connecting structure are provided according to the height of the frame body. Each layer of horizontal connecting structure is set horizontally and structural connecting rods fixed with reinforcement plates on the external ends are contact with the inner wall of the first anti-pressure tank, and form six contact points with the first anti-pressure tank, reinforcement plates are provided with bolt holes, and connected with the external connecting seat by bolts, and clamping the cylindrical shell body, and the connecting bolts are provided with leak proof measurement. Each of the first anti-pressure tanks is provided with at least two layers, that is, twelve external connecting seats; two steel chains are provided on each of external connecting seats of each of first anti-pressure tanks, and one steel chain is obliquely upward, and the other one is obliquely downward, and the two steel chains are respectively connected with the connecting seats provided on the communicating rods of the truss body. Several layers of horizontal connecting structure are provided on the part of the entrance pipe stretched out of the first anti-pressure tank to ensure the stability of the out of part of the structure. Six inlet and outlet water pipes are communicated to one pipe, then connected to the public high-pressure water pipe; the inlet and outlet air pipe is connected with the public high-pressure air pipe; the water level and air pressure are measured respectively by the first water level sensor and the first air pressure sensor, water level in the first anti-pressure tank is adjusted according to the needed load, and the buoyancy force provided to the truss body by the first anti-pressure tank is changed.

The truss body formed the columnar cavity A is provided with multiple guide pulley groups set intervally along the vertical direction; every guide pulley group comprises multiple guide pulleys. In a preferred solution, on the truss body formed the columnar cavity A, twenty-two guide pulleys 022 are set in the middle of every layer of horizontal connecting rods. The vibration damping structure is a straight reciprocating water pump pulled by the second floating body component (03); when a straight reciprocating water pump (072) is set, the water source is connected with the first inlet and outlet pipe (0212) through the straight reciprocating water pump (072).

The offshore platform further comprises a public high-pressure water pipe (08) and a public low-pressure water pipe (09), the public high-pressure water pipe (08) is connected with the public low-pressure water pipe (09) through a control valve (05), the public low-pressure water pipe (09) is connected with the atmosphere, and the water source comes from a public low-pressure water pipe (09); when a straight reciprocating water pump (072) is provided, the water inlet of the straight reciprocating water pump (072) is connected with the public low-pressure water pipe (09), and the water outlet of the straight reciprocating water pump (072) is connected with the first inlet and outlet water pipe (0212) through a public high-pressure water pipe (08); when the straight reciprocating dual-purpose pump (071) is provided, the first inlet of the three-way control valve (0711) A is connected with the public low-pressure water pipe (09), the first outlet of the three-way control valve B (0712) is connected with the first inlet and outlet water pipe (08) through the public high-pressure water pipe (0212).

The offshore platform further comprises a sporadic single floating body (013) hung on the overwater layer (10) when the tank is empty and constantly put down to the underwater layer when the tank is charged with water.

The sporadic single floating body (10) comprises a sporadic anti-pressure tank (101), a lifting equipment (102) for controlling the sporadic anti-pressure tank (101) lifting, a sporadic inlet and outlet water pipe (103) communicated with the bottom of the sporadic anti-pressure tank (101), a sporadic inlet and outlet air pipe (104) communicated with the top of the sporadic anti-pressure tank (101), a sporadic water level sensor (105) installed in the sporadic anti-pressure tank (101) and a sporadic air pressure sensor (106) provided on the sporadic anti-pressure tank (101). The sporadic inlet and outlet water pipe (103) is connected with the public low-pressure water pipe (09) through control valve (05) and/or connected with the public high-pressure water pipe (08) through control valve (05), the sporadic inlet and outlet air pipe (104) is connected with the public high-pressure air pipe (04) through control valve (05).

In a preferred solution, the structure of the sporadic single floating body (10) is basically same with that of the first floating body 021, when it is not in use, the sporadic single floating body (10) is hoisted and fixed to the upper part of the columnar cavity A at all times, and is not contacted with water. The sporadic single floating body provides backup buoyancy to the platform in the event that some of the first single floating bodies can not be used or in bad weather, and can be used as a water storage tank for storing water. As a water storage tank, sporadic inlet and outlet water pipes and sporadic inlet and outlet air pipes are connected to the retractable anti-pressure hoses, the lifting equipment is used to control the sporadic anti-pressure tank to rise and fall; with the water into the sporadic anti-pressure tank, the sporadic anti-pressure tank continually sinks into water to obtain buoyancy and to balance its own weight until the cylindrical shell is submerged into the water leaving only sporadic inlet and outlet water pipes and sporadic inlet and outlet air pipes on the water, water is pressurized out by high-pressure air when water is used; with water using, the sporadic anti-pressure tank continues to rise until hanging out of the water, and finally rising to overwater layer and fixed. In this way, when the sporadic single floating body is used as a water storage tank, the overall load of the universal offshore platform will be no big change.

Figure 6:
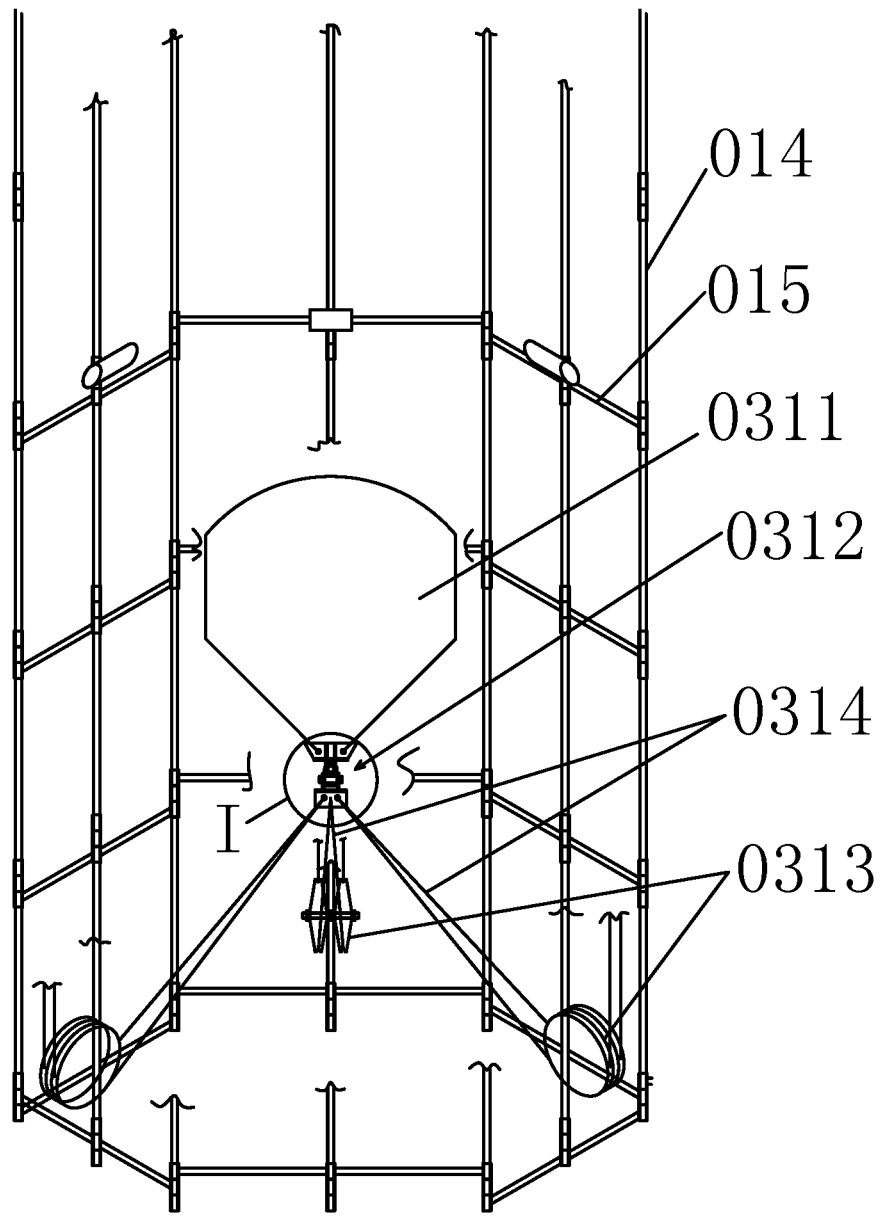
FIG. 6 is a schematic view of a second floating body component in an embodiment of the present invention.
Figure 10:
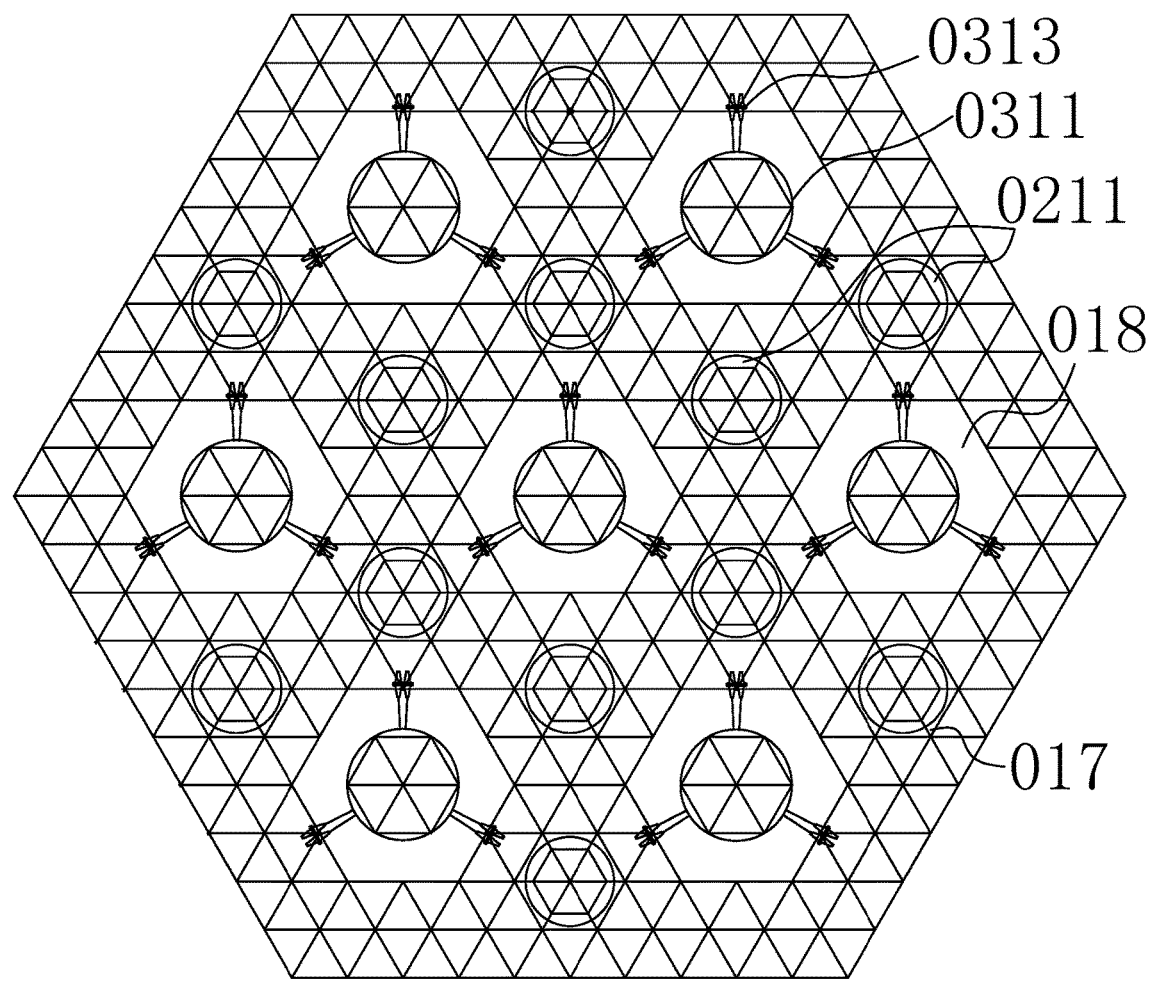
FIG. 10 is a horizontal projection view of A-A in FIG. 3.
Figure 11:
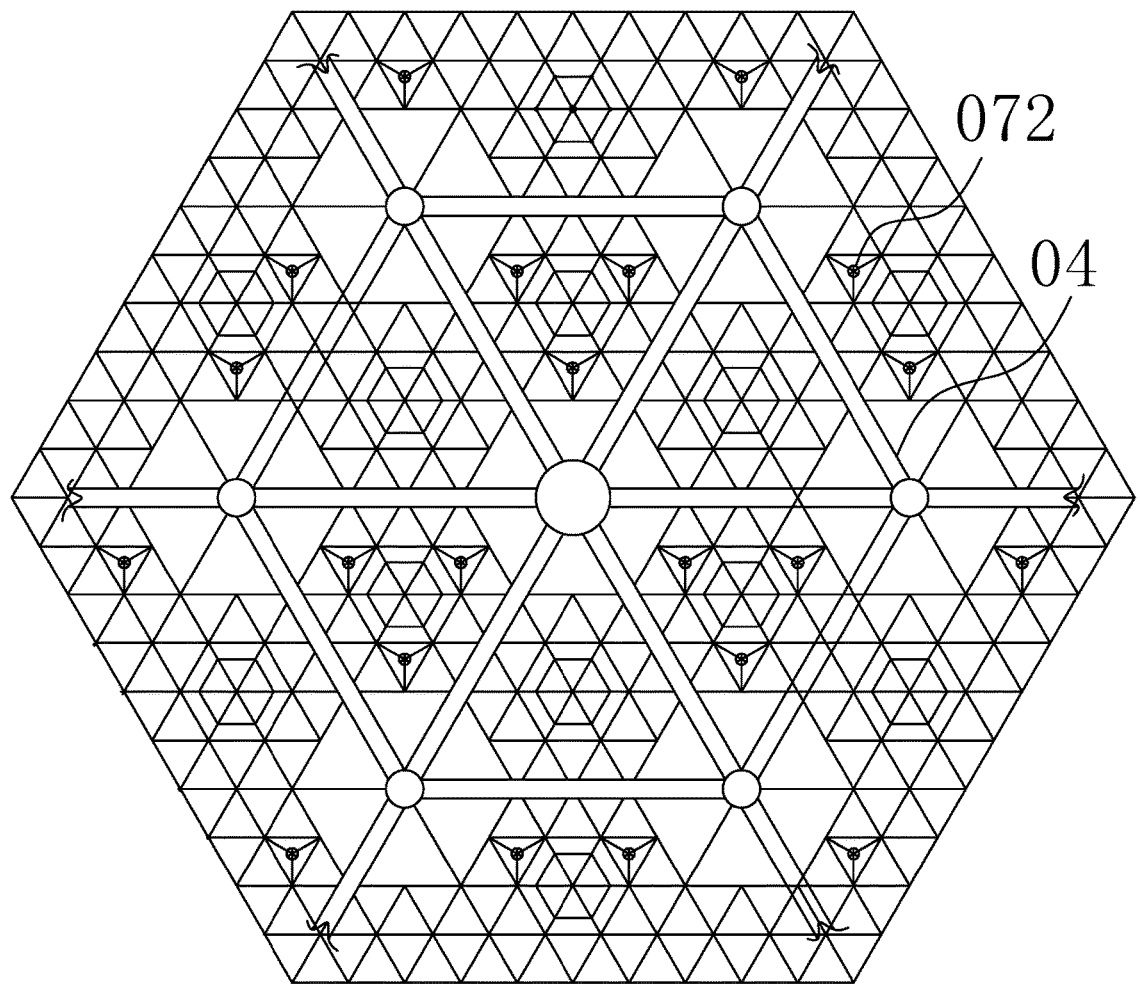
FIG. 11 is a horizontal projection view of B-B in FIG. 3.
Figure 12:
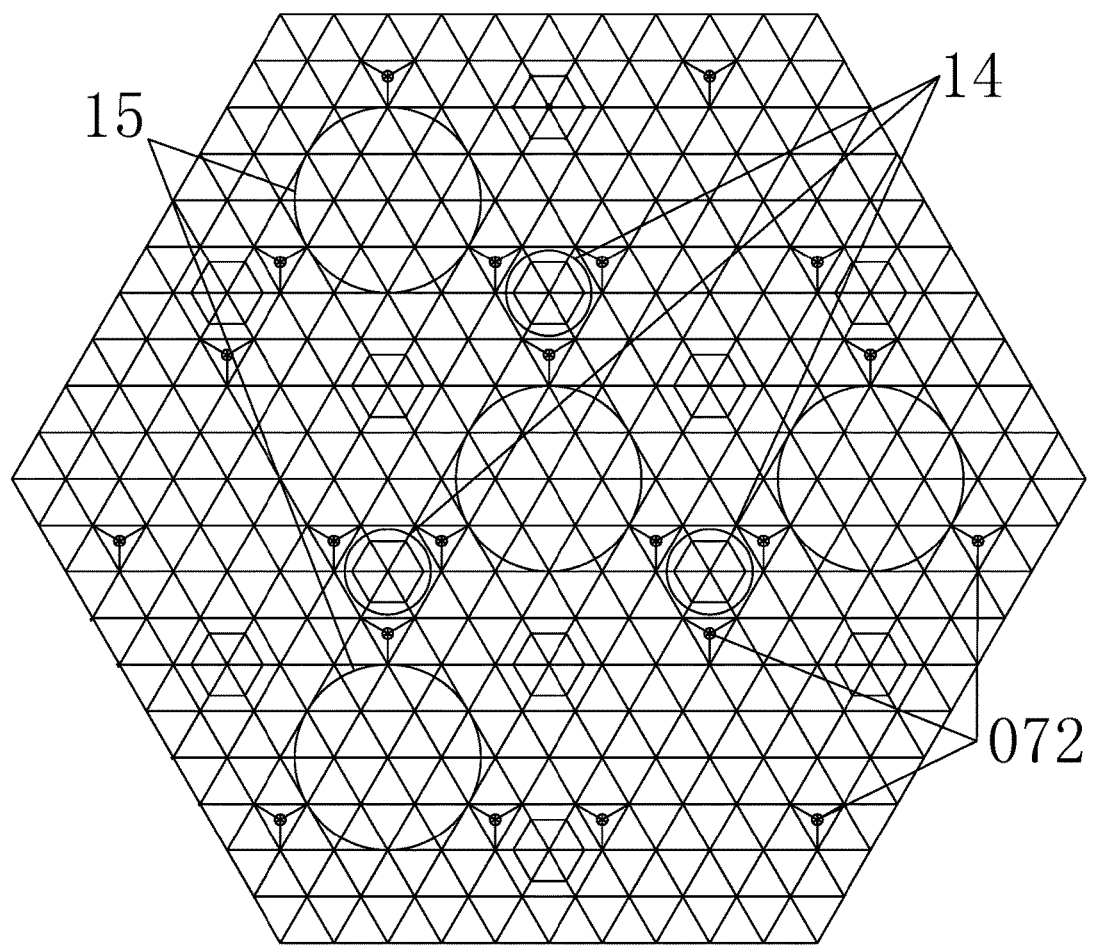
FIG. 12 is a horizontal projection view of C-C in FIG. 3.
Figure 13:
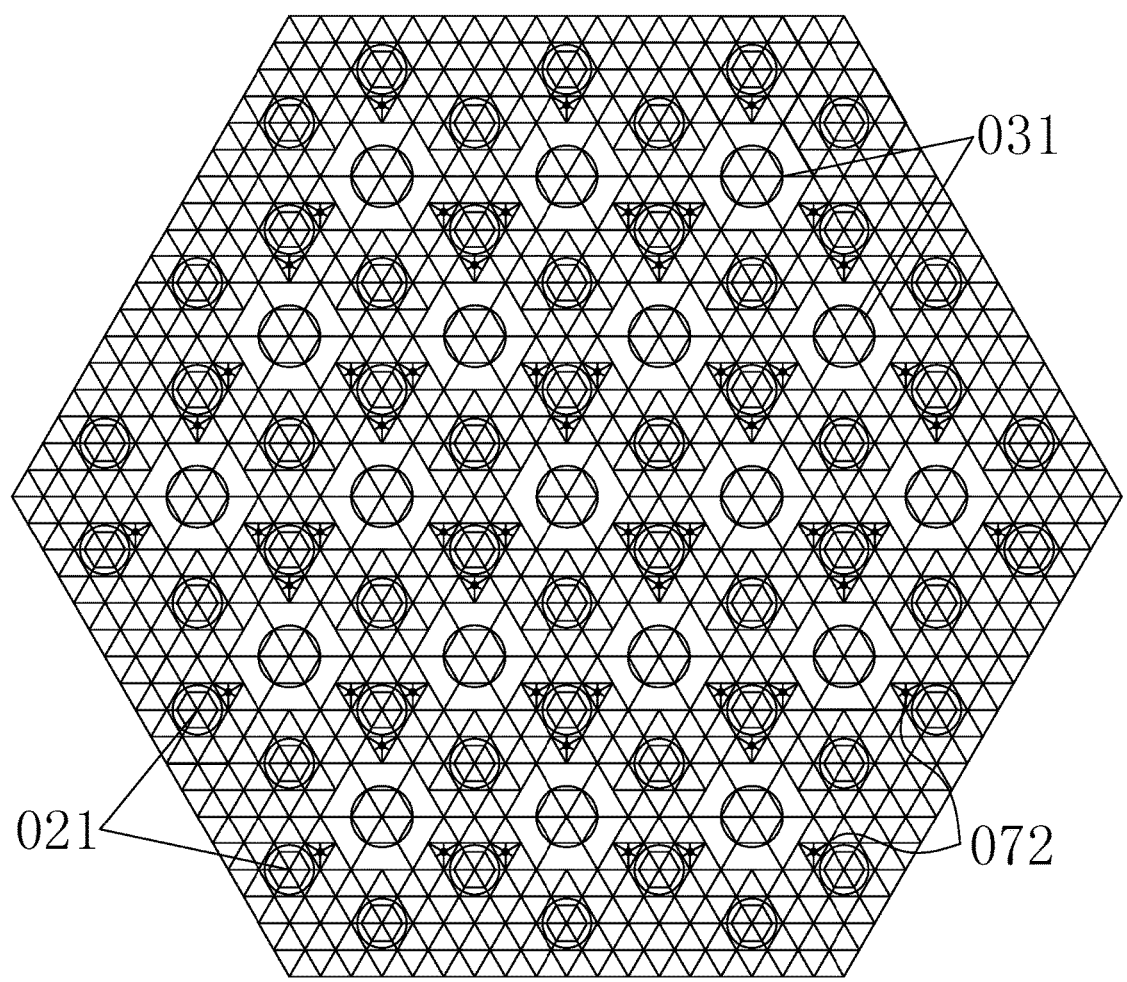
FIG. 13 is a horizontal projection view of a platform of the present invention.
Figure 14:
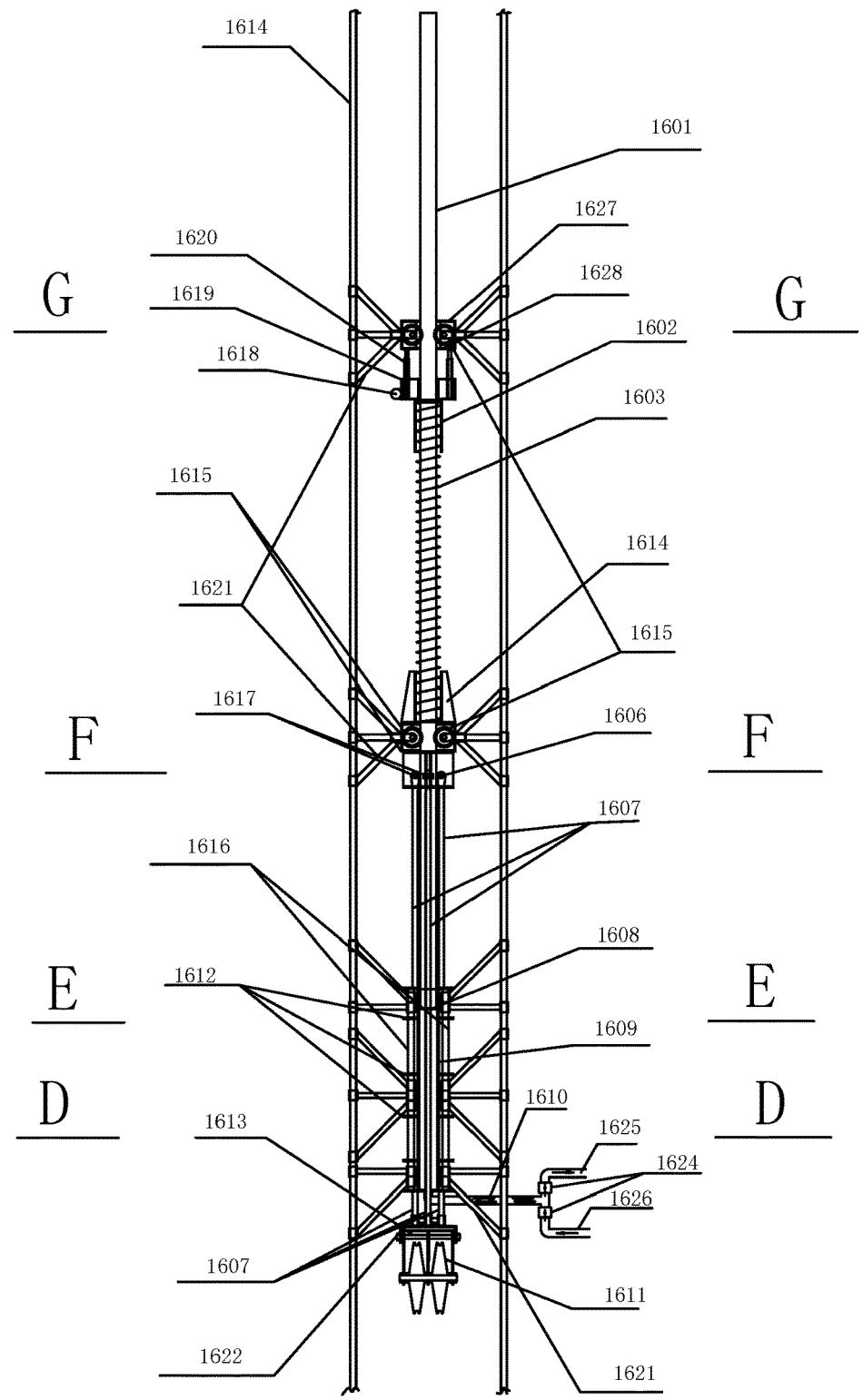
FIG. 14 is a schematic structural view of a straight reciprocating water pump of the present invention.
Figure 15:
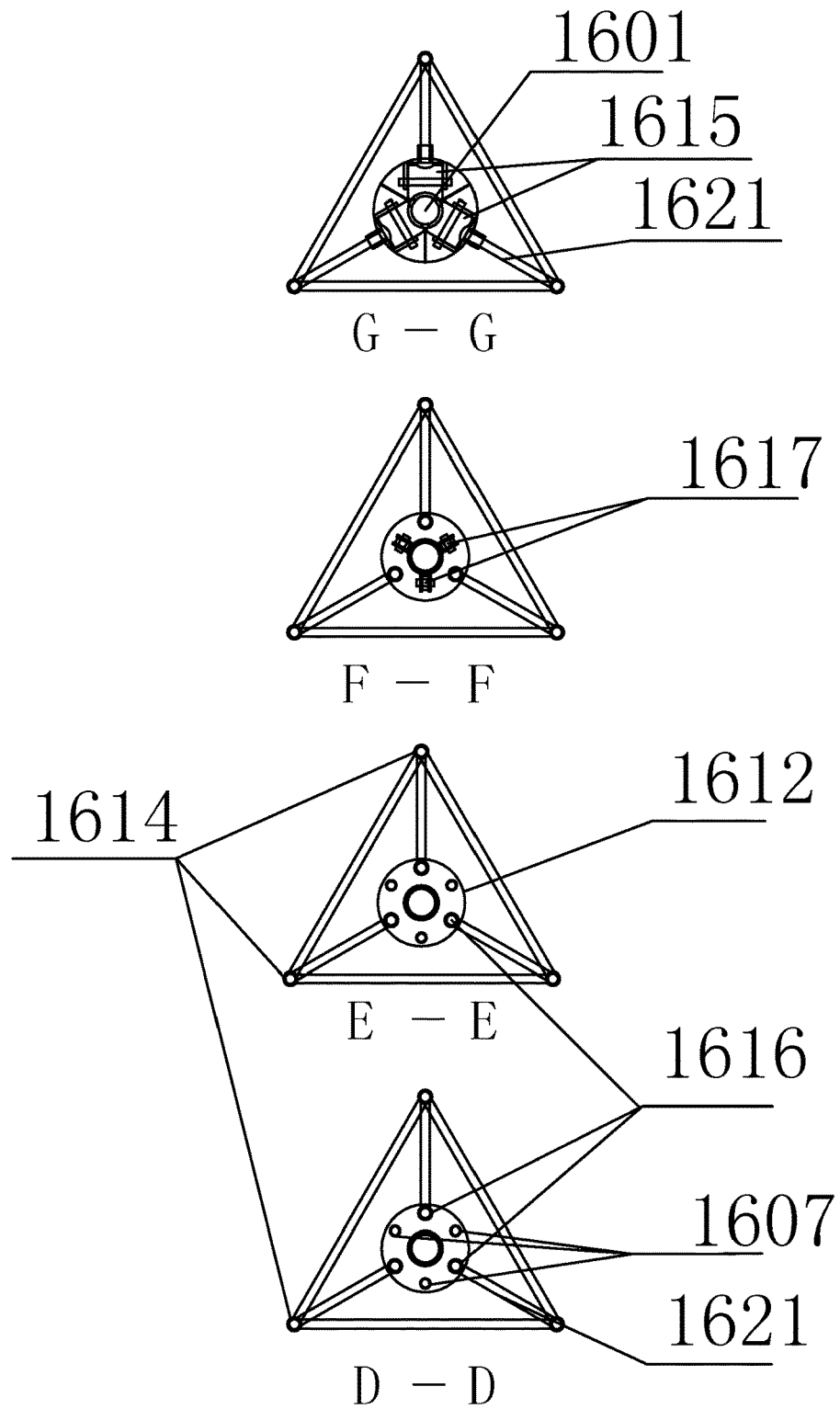
FIG. 15 is a simplified sectional view of D-D, E-E, F-F and G-G of FIG. 14.
Figure 16:
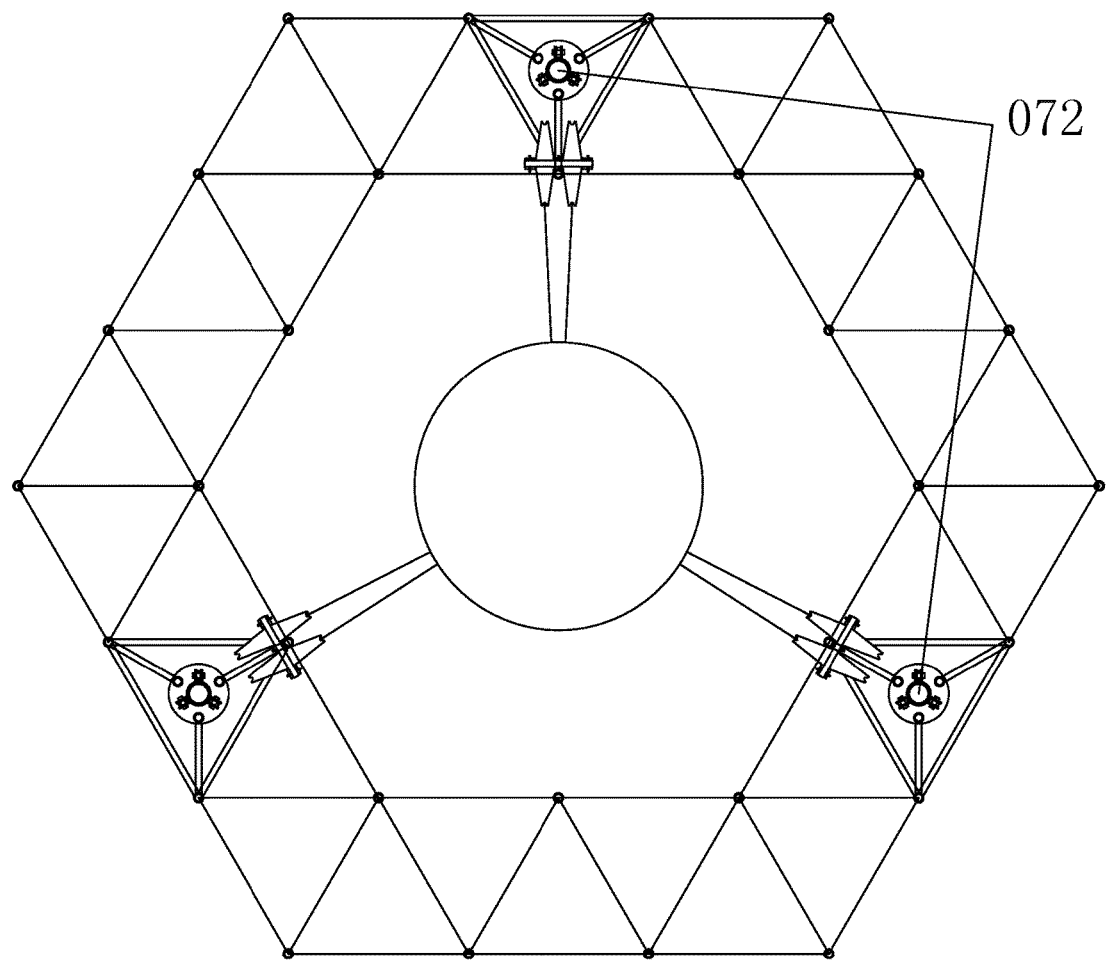
FIG. 16 is an application view of the structure shown in FIG. 15.

As shown in FIG. 6 and FIG. 10, the second floating body component (03) comprises a plurality of second single floating bodies (031) separately disposed in each columnar cavity B (018), the second single floating body (031) comprises a draining floating body (0311) and a connecting joint (0312) fixed to the lower end of the draining floating body (0311), each draining floating body (0311) pulls more than three vibration damping structures, and the vibration damping structure is arranged above the draining floating body (0311) and uniformly distributed around the vertical central axis of the columnar cavity B (018), the second single floating body further comprises more than three fixed pulleys (0313) fixed on the truss body (01) under the draining floating body (0311) and more than three steel rope members (0314) correspondingly connected between the connecting joint (0312) and the vibration damping structure and switched by the fixed pulley (0313). The connection between the fixed pulley and the truss body is dismountable, and it is lifted out of the water of repair and maintenance when necessary.

Because draining floating body of every second single floating body is restrained by more than three steel rope members in more than three directions, so no matter how the waves change, the drainage floating body will work following the binding force direction, every two second single floating bodies can separately react to the movement of ocean waves; when providing buoyancy to the truss body, wave energy is absorbed, and the volume of draining floating body determines force of the draining floating body no matter in what kind of sea condition. This fundamentally protects the platform from the destruction by the wave motion. In a preferred solution, every draining floating body is provided with three straight reciprocating water pumps arranged on the regular triangle cavity of the columnar cavity B on the overwater layer, every straight reciprocating water pumps pulled by one group of steel rope members; the draining floating body is provided on the bottom of the water surface layer, the draining floating body is divided into upper part which is a cylinder spherical roof and lower part which is a inverted cone, and the upper part and the lower part are integral.

Figure 7:
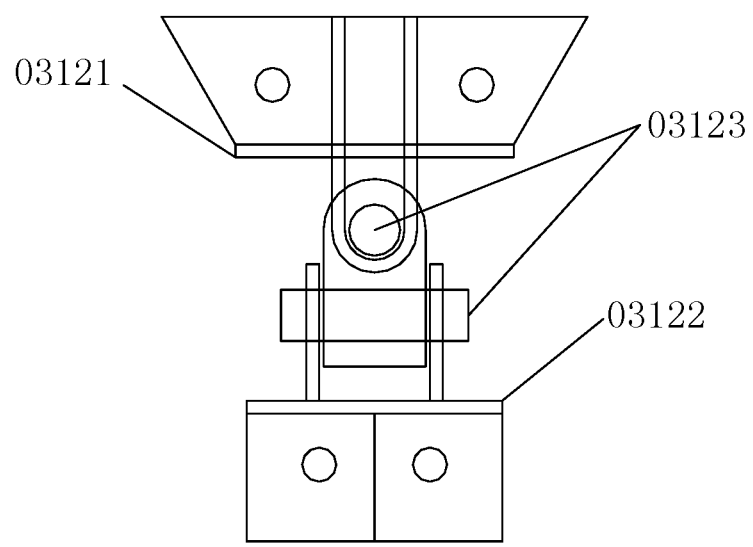
FIG. 7 is a schematic view of I in FIG. 6.
Figure 8:
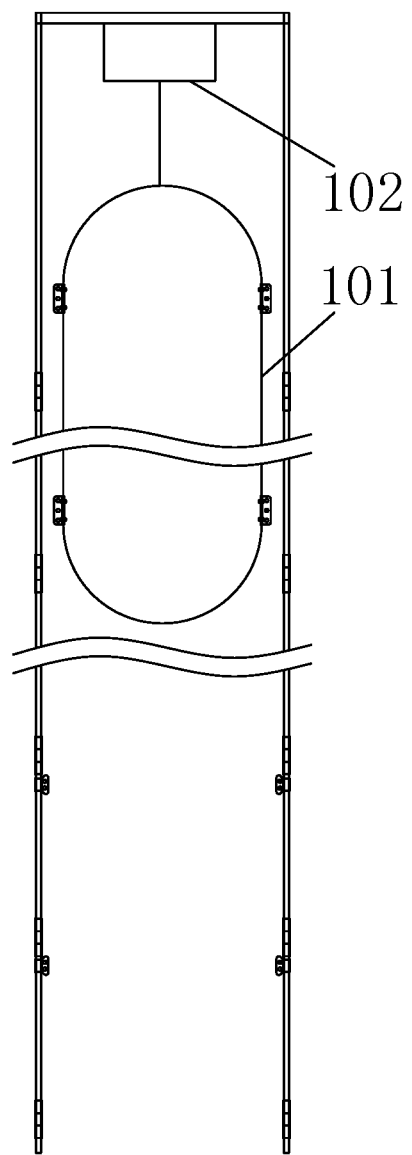
FIG. 8 is a simplified structural view of a sporadic single floating body in an embodiment of the present invention.

As shown in FIG. 6 and FIG. 7, the connecting joint (0312) comprises a connector (03121) fixedly connected with the draining floating body (0311), a connecting plate (03122) arranged under the connector and a universal joint (03123) or a steel connecting ring connected between the connector and the connecting plate (03122). More than three steel rope interfaces are provided on the bottom of the connecting plate and matched with the vibration damping structure. The universal joint is a two-axis cross-staggered structure, and the steel ring chain comprises more than three successively connected steel rings. Multiple steel rope interfaces are arranged around the point of the bottom of the connecting plate and are equally interval. Every steel rope interface can be connected with one group of steel rope members consisted by multiple steel ropes, multiple steel ropes are seen as one rope, every group of steel rope members are guided by the corresponding set fixed pulley of the underwater layer of the truss body, the number of the fixed pulley is corresponding to the number of the steel rope, and the straight reciprocating water pump is pulled to work by the corresponding steel rope.

Figure 9:
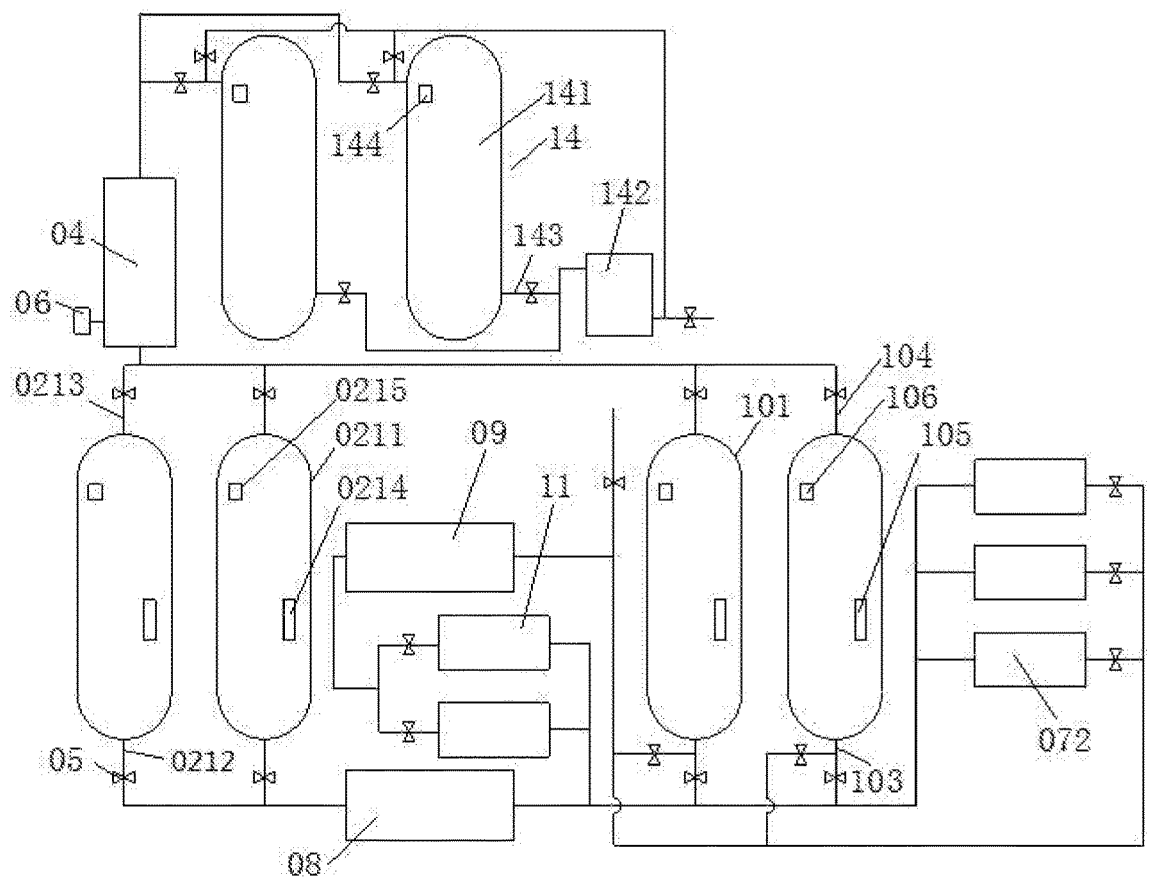
FIG. 9 is a simplified schematic view of the connection structure of the embodiment shown in FIG. 3.

As shown in FIG. 9, there are several branch water pipe provided between the public high-pressure water pipe (08) and the public low-pressure water pipe (09), and hydraulic generators are set on the branch water pipes.

The universal offshore platform further comprises the living cabin provided on the overwater layer, the living cabin is made by locking the light board on the rods of the overwater layer and available for living, the light boards have enough strength, and the density of the light boards is less than water and the material of the light boards is non-absorbent.

The universal offshore platform further comprises important an equipment cargo hold, the important equipment cargo hold is the watertight cabin structure and provided with air pipe. In an embodiment, the important equipment cargo hold is provided with external connecting seat structure connected with the truss body through steel rings.

Figure 17:
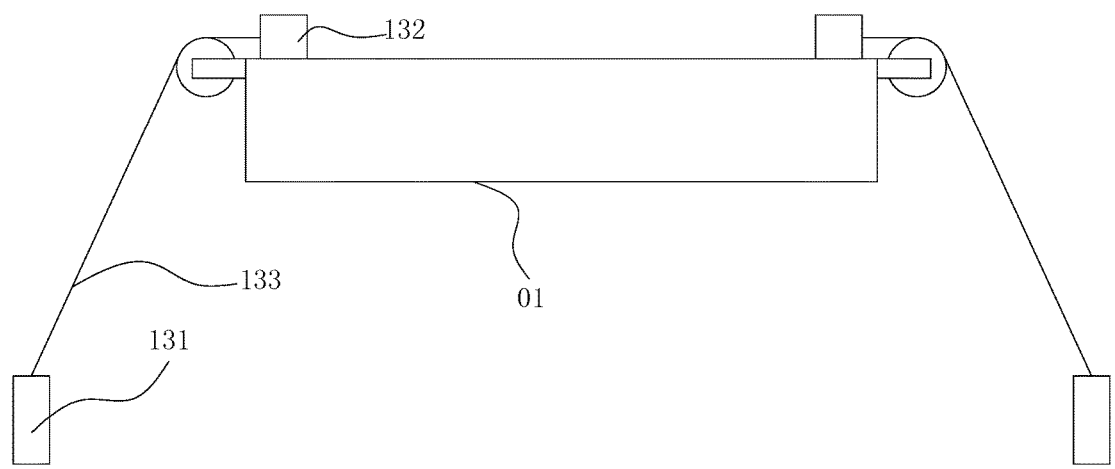
FIG. 17 is a schematic structural view of an anchor component of the present invention.

As shown in FIG. 17, the universal offshore platform further comprises more than one anchoring components, the anchoring component comprises a submarine pile (131) fixed on the shallow submarine, a winch (132) fixed on the overwater layer and anchoring chains (133) provided between the submarine pile (131) and the winch (132), and the contraction and release of the anchoring chains are controlled by the winch (132). In a preferred solution, when mooring anchor is fixed on the shallow sea, the anchoring system can improve the efficiency of absorbing wave energy of the second floating body component; the universal offshore platform is at the best buoyancy state by relaxing and stringing the anchoring chains according to the the tide and the ebb, and has a fixed height reference point, and the work efficiency of the second floating body components are improved.

The offshore platform further comprises a buoyancy control device that displays the working status of the platform in real time and controls the operation of the corresponding equipment, and more than one immersion level sensors to monitor the draft depth of the truss body (01), the control valve (05) and pressure relief valve (06) are automatic control valves; the buoyancy control device is respectively connected with the water level sensors, the pressure sensors and the automatic control valves, according to the change of the load on the truss body (01), the air pressure and the water level in each first anti-pressure tank (0211) and the sporadic anti-pressure tank (101), it can adjust the state of the first pressure-resistant tank (0211) and sporadic pressure tank (101) between the statement and truss body (01) buoyancy balance regulation.

The method for adjusting the buoyancy of a universal offshore platform comprises the following steps:

each of the first anti-pressure tank (0211) of the first single floating bodies (021) stores water, the public high-pressure water pipe (08) makes the first anti-pressure tanks (0211) connected to each other, the high-pressure gas source charges the first anti-pressure tanks with high-pressure air and balances the pressure in each other through the public high-pressure air pipe (04), so that each of the first anti-pressures stores the same amount of water to obtain buoyancy balance;

when the number of first single floating bodies (021) fixed on the underwater layer remains constant, using sporadic single floating body (10) as water storage tank, introducing the water from the first anti-pressure tank (0211) into the water storage tank, as the amount of water entering the storage tank increases, the gravity of the water storage tank can be balanced by the gradual lowering of the water storage tank into the water, the platform buoyancy increases; the water in the water storage tank is pressured into the public low-pressure water pipe (09) by using high-pressure air, at the same time the power generation of the turbine generator (11) is reduced, and water in the water storage tank is introduced into the first anti-pressure tank (0211); as the amount of water in the water storage tank decreases and the water storage tank is gradually lifted until it returns to the overwater level (013) and returns to a sporadic single floating body (10), the buoyancy of the platform is reduced.

When the number of first single floating bodies fixed in the underwater layer is changed, using sporadic single floating body (10) as water storage tank, after the added first single floating body (021) is stored with water, and put the added first single floating body (021) to the underwater layer, so that the first single floating body are at the same level with the added first single floating body, and the added first single floating body is fixedly connected in the same way that the first single floating body is connected in, then high-pressure air is supplied to the added first anti-pressure tank (0211) of the added first single floating body, when the required buoyancy is achieved, high-pressure air is stopped to supply, adjusting the air pressure of the added first anti-pressure tank to be equalized with the air pressure of each of the first anti-pressure tanks, and communicate with each other, and the platform buoyancy increases; when the selected first single floating body is reduced the pressure and added with water and relieved the connection with the underwater layer as a water storage tank, and then pumping high-pressure air into the water storage tank.

The stable power generation method of the universal offshore platform comprises the following steps:

by setting the first floating body component (02) and the pressure value of high-pressure air in the public high-pressure air pipe (04), the minimum output pressure value of the vibration damping structure is determined to control and maintain the stability of the high-pressure air pressure in the public high-pressure air pipe (04) and the first floating body component (02); according to the water flow pumped to the public high water pipe by vibration damping structure or the air flow pumped to the public high air pipe by vibration damping structure by vibration damping structure, turning on the corresponding number and power of hydraulic generator (11) or air expansion generator or screw expansion generator (12), matching the water flow or air flow for generating electricity to the water flow or air flow pressed by the dampening structure, at the same time ensuring the balance of water circulation flow of the public high water pipe (08) and the public low water pipe (09), ensuring that the high-pressure air pressure in the first floating body component (02) and the public high-pressure air pipe (04) is stable at the set value.

In a preferred solution, the buoyancy control device is a computer system, the computer system comprises mainframe, monitor etc., it can real-time display the plane graph of the underwater layer and water surface layer of the platform, numbers of each first single floating body and the second floating body are corresponding to the figure shown, the first single float water level and pressure state of the first single floating body are real-time displayed, the working states of each second single floating body are displayed, the switch states of each control valve and pressure relief valve are displayed, and control valves and pressure relief valves are controlled according to the need, the pressure of air storage tank is displayed, the states of sporadic single floating bodies are displayed, and so on. Most of the buoyancy of the platform is provided by the first floating body component, the last and little buoyancy of the platform is provided and determined by the second floating body component, stand-by safe buoyancy of the platform is provided by sporadic single floating bodies. The optimal buoyancy state of the platform is that the first buoy component is draught just right to the top, the second buoy component has just got the buoyancy and steel ropes are tension, the volume of the rigid connection of the truss body is only the volume of truss body itself in the wave activity area, and the adverse effects of the waves are minimal. The purpose of the control of the buoyancy control device is to increase or decrease the buoyancy obtained by the platform in time to cope with the load changes caused by different conditions, so that the platform is always in a state of optimal buoyancy: a small amount of load increase can be directly reflected by the draft of the second floating body component; a slightly amount of load increase can make water in the first anti-pressure tank migrate to the water storage tank called from the sporadic anti-pressure tank, water capacity in the first anti-pressure tank has certainly adjustable quantity, water is diverted into the water storage tank from the public low-pressure water pipe by a pipe, and at the same time hydraulic generator is turned on and the power of generating electricity is increased, and meanwhile pressure air is added in the anti-pressure tank, and volume of the added pressure air is same to the inverted water in the anti-pressure tank, namely the transfer of water is completed, the buoyancy of the first single floating body; a greater amounts of load increase can increase the number of the first anti-pressure tanks, after the sporadic anti-pressure tank sinks to the position which is the same height as the floating body, the sporadic anti-pressure tank is fixedly connected with the truss body, the sporadic inlet and outlet water pipe is connected with the public high-pressure water pipe, high-pressure air is pumped in the sinking fixed sporadic anti-pressure tank to increase the pressure, the water level is down to the same as the first single floating body, stopping pressuring, and the pressure is the same as that of the other first single floating bodies, meanwhile the sporadic inlet and outlet water pipe of another sporadic anti-pressure tank is connected with the public low-pressure water pipe to invert water, the excess water of the previous sporadic anti-pressure tank is taken out, then the previous sporadic anti-pressure tank is added to the first floating body component as a first floating body; otherwise, when the universal offshore platform is unloaded water should be added into the first floating body component from the first single floating body, or the number of the first single floating body of the first floating body component is decreased. The public high-pressure air pipe is not communicated with the first single floating body when operating normally, each of the first single floating bodies of the first floating body component is same in water level and air pressure, individual first single floating body damage leakage and the differences of different seal ability of first single floating bodies will cause corresponding change of water level and air pressure of different first single floating body, the connection of individual first single floating body with the public high-pressure water pipe is closed selectively and regularly, the inner water level and pressure should not be changed in unit time, or the change is within the prescribed scope, the buoyancy control device can make accurate regulation through timely monitoring the change and difference of the inner water level and pressure between individual first single floating body and the first single floating bodies to make the water level and air pressure in all first single floating bodies same and change synchronously; pressing a single first single buoy separately will reduce its internal water level.

In the above preferred solution, when the platform is stable, the buoyancy control device can be used for generating electricity stably:

there are high-pressure air in the first anti-pressure tank of the first floating body component, the first inlet and outlet air pipe is connected with the public high-pressure air pipe through a control valve; the public high-pressure air pipe is connected to the air storage tank through a control valve; there are light water in the first anti-pressure, the the first anti-pressure is connected to the public high-pressure water pipe through a control valve; the public high-pressure water pipes are connected with all the outlets of the all the straight reciprocating water pump through control valves; second single floating bodies of the second floating body component simultaneously pull three straight reciprocating pumps under the action of the waves to pressurize water flow continuously, and the pressurized water flow converge on the public high-pressure water pipe; the public high-pressure water pipe orderly distributes the high-pressure water flow exported by straight reciprocating pumps to each of the hydraulic generators for generating electricity; the hydraulic generators comprises multiple sets of units with different power; the outlet water pipe of the hydraulic generator is connected with the public low-pressure water pipe, the public low-pressure water pipe is connected with the inlets of all the straight reciprocating pumps through control valves, the public low-pressure water pipe is connected with multiple branch pipes to communicate to the overwater layer to utilize the atmospheric pressure; the public high-pressure water pipe, the public low-pressure water pipe and the public high-pressure air pipe are respectively provided with main pipes and branch pipes, and the three kinds of pipes are parallel to each other; the power generation system uses water as a medium for energy transmission and reuse. The buoyancy control device can command the control valves and the pressure relief valves to open and close, the pressure relief valves and/or air storage tanks with different pressure are used to collect increase or decrease the air pressure of all first single floating bodies of the first floating body component to adapt to higher wave height or to improve the sensitivity of the second floating body component; when changing the air pressure of the first single floating body, the water level of the first single floating body is not changed, and air pressure of all first single floating bodies are increased or decreased simultaneously. In the absence of active regulation of the overall internal pressure of the first floating body component, the power generation power regulation is made according to the change of air pressure in the first float component; when the pressure in the first floating body component rises continuously, generation output power is increased, otherwise generation output power is decreased, and generation power matches to the power actually absorbed, so that stable and high quality power output can be achieved. Circulating water within the system is a relatively constant amount, so it can also be adjusted according to the change of water storage capacity of public low-pressure water pipes, when the total power of the second floating body component absorbing the wave energy is greater than the total instantaneous generation power of the hydraulic generator, it will be reflected when the total power absorbed by the second floating body component in the wave power is less than the instantaneous power generated by the hydraulic generator, it will be reflected by the reduction of water quantity in the public low-pressure water pipe; according to the above water changes, generation power is adjusted timely, and it can also bring power into balance and then get and output high-quality electricity; the total power generation can be adjusted through the regulation of hydraulic generator own, or by increasing or reducing the number of generating units. The decrease of the water quantity in the public low-pressure water pipe and the continuous rise of the pressure in the first floating body component or the increase of the water quantity in the public low-pressure water pipe and the continuous decrease of the pressure in the first floating body component must be unified, when contradictory, it shows that there are leakage in the system.

Different types of offshore platforms are made up in the invention (see FIGS. 10 and 13), the overall external shape and scale of the truss body are determined by the functional requirements, the result usual optimization is that the overall horizontal projection of the offshore platform is a regular hexagon, the side length of the regular hexagon is greater than the height, the set height of water surface is that the largest floating range of the second floating body floating up and down in this type of universal platform, the universal offshore platform further comprises a driving system, the driving system comprises a dynamic system and an engine compartment, the driving system of the universal offshore platform can use the existing mature technologies, and the universal offshore platform can be equipped with a variety of power systems, and the electric drive systems are used in preference; the engine compartment is watertight compartment type, the power system is installed in the power cabin, the universal offshore platform is provided with multiple engine compartments. The universal offshore platform is provided with various necessary accessory equipment, such as sea water desalination unit, lifting hoisting machinery, life and environmental protection equipment etc.

Embodiment 2

Figure 18:
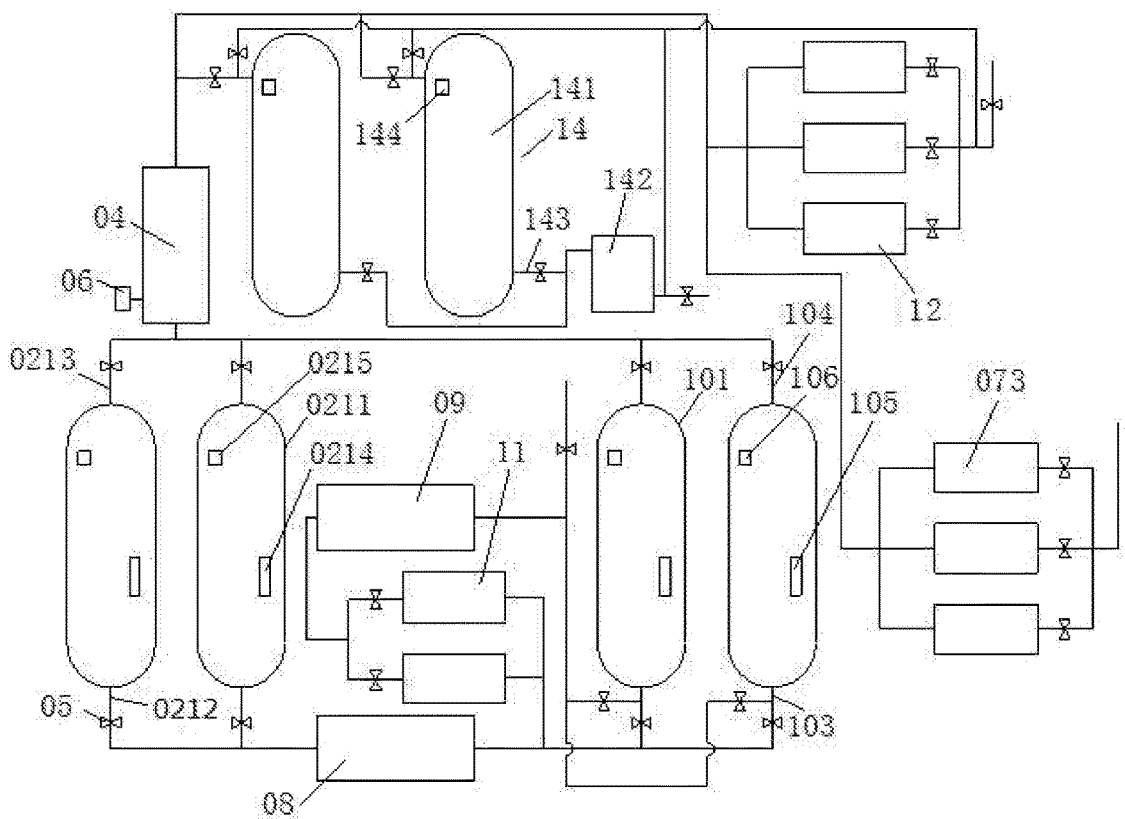
FIG. 18 is a schematic diagram of a connection structure in an embodiment of the present invention.

As shown in FIG. 18, the present invention provides a schematic diagram of a connection structure in an embodiment of the present invention. The difference between this embodiment and embodiment 1 lies in that:

the vibration damping structure of the offshore platform is a straight reciprocating air pump (073) pulled by the second floating body component (03); when a straight reciprocating air pump (073) is provided, the inlet of the straight reciprocating air pump (073) is connected with the low-pressure air source, and the outlet of the straight reciprocating air pump (073) is connected with the public high-pressure air pipe (04).

The public high-pressure air pipe (04) is connected with several branch air pipes, and the branch air pipes are provided with air expansion generators or screw expansion generators (12). The other technical solutions in this embodiment are the same as those in embodiment 1, and details are not repeated herein.

Embodiment 3

Figure 19:
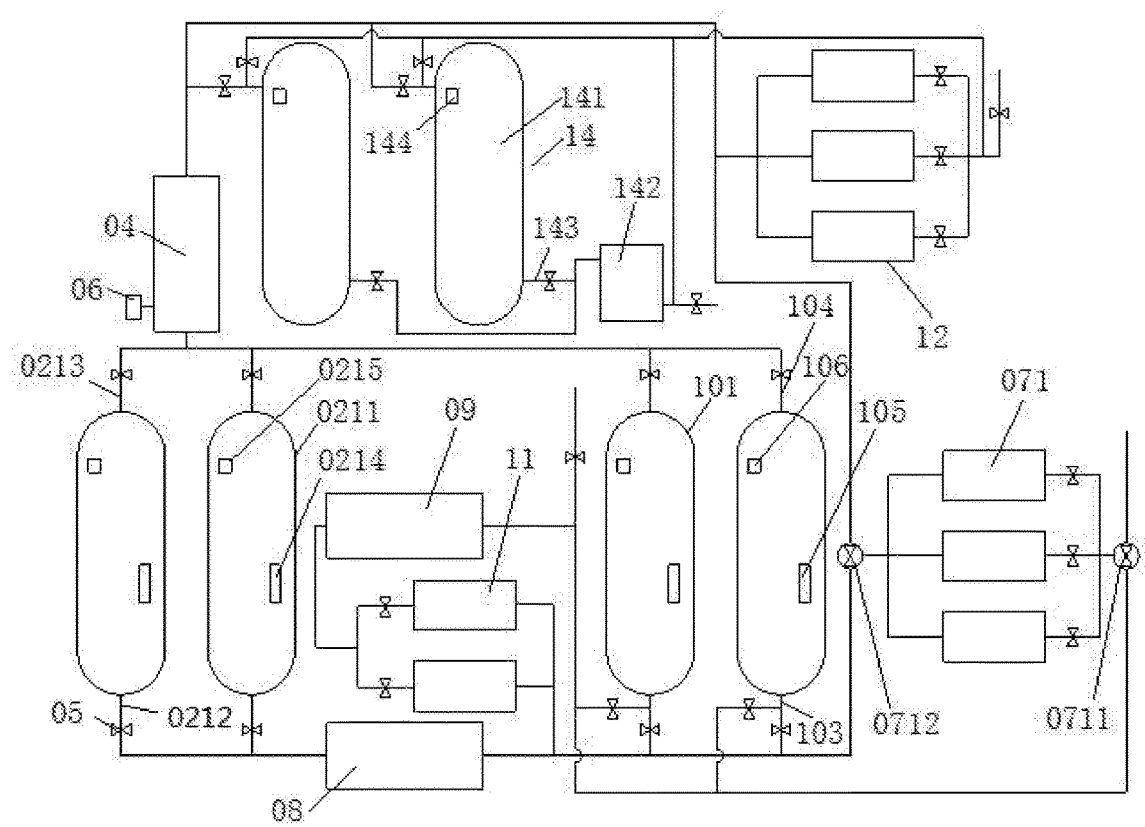
FIG. 19 is a schematic diagram of a connection structure in an embodiment of the present invention.

As shown in FIG. 19, the present invention provides a schematic diagram of a connection structure in an embodiment of the present invention. The difference between this embodiment and embodiment 1 lies in that:

the vibration damping structure of the offshore platform is a straight reciprocating dual-purpose pump (071) pulled by the second floating body component (03); when a straight reciprocating dual-purpose pump (071) is provided, a three-way control valve B (0712) and a three-way control valve A (0711) are respectively arranged at the inlet and outlet of the straight reciprocating dual-purpose pump; the first inlet of the three-way control valve A (0711) is connected with the water source, the second inlet of the three-way control valve A (0711) is connected with the low-pressure air source, the outlet of the three-way control valve A (0711) is connected with the inlet of straight reciprocating dual-purpose pump (071); the first outlet of the three-way control valve B (0712) is connected with the first inlet-outlet water pipe, the second outlet of the three-way control valve B (0712) is connected with a public high-pressure air pipe (04), the inlet of the three-way control valve B (0712) is connected with the inlet of the straight reciprocating dual-purpose pump (071).

The public high-pressure air pipe (04) is connected with several branch air pipes, and the branch air pipes are provided with air expansion generators or screw expansion generators (12). The other technical solutions in this embodiment are the same as those in embodiment 1, and details are not repeated herein.

What is claimed is:

1. A universal offshore platform, comprising:
a truss body forming a supporting system of the offshore platform;
wherein the truss body is a three-dimensional stable rigid support body formed by connecting strip-shaped rods and is provided with an underwater layer, a water surface layer and an overwater layer from bottom to top;
the truss body comprises a first floating body component fixed to the underwater layer, a second floating body component arranged in the water surface layer and connected to the truss body through a plurality of vibration damping structures, and a plurality of sporadic single floating bodies suspended on the overwater layer when a tank is empty of a liquid; the first floating body provides more than 90% buoyancy for the offshore platform and comprises a plurality of first single floating bodies located in the underwater layer; the second floating body component works together with the first floating body component to ensure the offshore platform floating and comprises a plurality of second single floating bodies located in the water surface layer; the sporadic single floating bodies are continuously lowered into the water when storing liquid and served as a first single floating body fixed on the underwater layer; the second floating body component further comprises draining floating bodies and each of the draining floating body pulls more than three vibration damping structures.

2. The universal offshore platform according to claim 1, wherein the truss body further comprises a high-pressure air pipe, the high-pressure air pipe is connected with a high-pressure air source through a control valve, and the high-pressure air pipe is provided with a pressure relief valve; the first single floating body comprises a first anti-pressure tank, a first inlet and outlet water pipe and a first inlet and outlet air pipe communicated with the first anti-pressure tank; the first inlet and outlet water pipe is communicated with a bottom of the first anti-pressure tank, the first inlet and outlet air pipe is communicated with a top of the first anti-pressure tank, and the first single floating body further comprises a first water level sensor provided in the first anti-pressure tank and a first air pressure sensor provided on the top of the first anti-pressure tank; the first inlet and outlet water pipe is connected with a water source through a control valve, and the first inlet and outlet air pipe is connected with the high-pressure air pipe through the control valve.

3. The universal offshore platform according to claim 2, wherein the vibration damping structures are one or more of a straight reciprocating dual-purpose pump, a straight reciprocating water pump or a straight reciprocating air pump pulled by the second floating body component; when the straight reciprocating water pump is provided, the water source is connected to the first inlet and outlet water pipe through the straight reciprocating water pump; when the straight reciprocating air pump is provided, an air inlet of the straight reciprocating air pump is connected with a low-pressure gas source, and an air outlet of the straight reciprocating air pump is connected with a high-pressure gas source; when the straight reciprocating dual-purpose pump is provided, a three-way control valve B and a three-way control valve A are respectively arranged at an inlet and an outlet of the straight reciprocating dual-purpose pump; a first inlet of the three-way control valve A is connected with the water source, a second inlet of the three-way control valve A is connected with the low-pressure gas source, and an outlet of the three-way control valve A is connected with the inlet of the straight reciprocating dual-purpose pump; a first outlet of the three-way control valve B is connected with the first inlet and outlet water pipe, a second outlet of the three-way control valve B is connected with the high-pressure air pipe, and an inlet of the three-way control valve B is connected with the outlet of the straight reciprocating dual-purpose pump.

4. The universal offshore platform according to claim 3, wherein the offshore platform comprises a high-pressure water pipe and a low-pressure water pipe, the high-pressure water pipe is connected with the low-pressure water pipe through a control valve, the low-pressure water pipe is connected with the atmosphere, and the water source comes from the low-pressure water pipe; when the straight reciprocating water pump is provided, a water inlet of the straight reciprocating water pump is connected with the low-pressure water pipe, and a water outlet of the straight reciprocating water pump is connected with the first inlet and outlet water pipe through the high-pressure water pipe; when the straight reciprocating dual-purpose pump is provided, the first inlet of the three-way control valve A is connected with the public low-pressure water pipe, and the first outlet of the three-way control valve B is connected with the first inlet and outlet water pipe through the high-pressure water pipe.

5. The universal offshore platform according to claim 4, wherein the sporadic single floating body comprises a sporadic anti-pressure tank, a lifting equipment for controlling the sporadic anti-pressure tank, a sporadic inlet and outlet water pipe communicated with a bottom of the sporadic anti-pressure tank, a sporadic inlet and outlet air pipe communicated with a top of the sporadic anti-pressure tank, a sporadic water level sensor installed in the sporadic anti-pressure tank and a sporadic air pressure sensor provided on the sporadic anti-pressure tank; the sporadic inlet and outlet water pipe is connected with the low-pressure water pipe and the high-pressure water pipe through the control valve, and the sporadic inlet and outlet air pipe is connected with the high-pressure air pipe through the control valve.

6. The universal offshore platform according to claim 5, wherein a plurality of branch water pipes are connected between the high-pressure water pipe and the public low-pressure water pipe, and the branch water pipes are provided with a hydraulic generator.

7. The universal offshore platform according to claim 2, wherein a plurality of branch air pipes are connected to the high-pressure air pipe, and an air expansion generator or a screw expansion generator is arranged on the branch air pipes.

8. The universal offshore platform according to claim 2, wherein the truss body is a three-dimensional stable rigid support body formed by strip-shaped rods, a horizontal projection of the truss body is a regular hexagonal honeycomb structure with a regular triangular grid as a wall thickness; the truss body comprises a communicating rod vertically disposed and forming nodes of the regular triangular grid with horizontal projections, a flat connecting rod horizontally disposed and forming sides of the regular triangular grid with horizontal projections, and a bevel connecting rod obliquely connected between two communicating rods; the flat connecting rods form a plurality of layers of regular triangle grids; the horizontal projection of the water surface layer is formed by two regular hexagons with different dimensions and specifications separated by a regular triangle grid; each large-size regular hexagon is adjacent to multiple small regular hexagons across a regular triangular grid; and the small size regular hexagon is the horizontal projection of a first columnar cavity, and the first columnar cavity is communicated from the underwater layer to the overwater layer; the large size regular hexagon is the horizontal projection of a second columnar cavity.

9. The universal offshore platform according to claim 8, wherein the first single floating body is arranged in the first columnar cavity; the first single floating body further comprises a structural connecting rod and an external connecting seat; a first inlet and outlet water pipe and the first inlet and outlet air pipe vertically penetrate from the top of the first anti-pressure tank and extend to the bottom of the first anti-pressure tank; the first inlet and outlet water pipe, the first inlet and outlet air pipe, and the structural connecting rod form a support in the first anti-pressure tank for strengthening the structural strength of the first anti-pressure tank; the support is fixedly connected with a wall of the first anti-pressure tank; an outer wall of the first anti-pressure tank body is provided with external connecting seats, each of the external connecting seats is connected with a pair of fixing ropes or chains connected with the truss body and extending upwards and downwards respectively; the external connecting seats are provided with a joint connected with the fixing ropes or chains.

10. The universal offshore platform according to claim 8, wherein the second floating body component comprises a plurality of second single floating bodies separately disposed in each second columnar cavity, the second single floating body comprises a draining floating body and a connecting joint fixed to a lower end of the draining floating body, each drainage floating body pulls more than three vibration damping structures, and the vibration damping structures are arranged above the draining floating body and uniformly distributed around the vertical central axis of the second columnar cavity; the second single floating body further comprises a fixed pulley fixed on the truss body under the draining floating body and arranged corresponding to the vibration damping structures, and a steel rope member correspondingly connected between the connecting joint and the vibration damping structures and switched by the fixed pulley.

11. The universal offshore platform according to claim 10, wherein the connecting joint comprises a connector fixedly connected with the draining floating body, a connecting plate arranged under the connector and a universal joint or a steel ring chain connected between the connector and the connecting plate.

12. The universal offshore platform according to claim 5, wherein the offshore platform further comprises a buoyancy control device for displaying the working status of the offshore platform in real time and controlling the operation of corresponding equipment, and more than one immersion level sensor for monitoring the draft depth of the truss body; the control valve and pressure relief valve are automatic control valves; the buoyancy control device is respectively connected with the water level sensor, the pressure sensor and the automatic control valve; according to the change of the load on the truss body, the air pressure and the water level in each first anti-pressure tank and the sporadic anti-pressure tank, the state regulation between each first anti-pressure tank and the sporadic anti-pressure tank and the buoyancy equilibrium regulation of the truss body are realized.

13. The universal offshore platform according to claim 6, wherein the offshore platform further comprises a buoyancy control device for displaying the working status of the offshore platform in real time and controlling the operation of the corresponding equipment, and more than one immersion level sensor for monitoring the draft depth of the truss body, the control valve and pressure relief valve are automatic control valves; the buoyancy control device is respectively connected with the water level sensor, the pressure sensor and the automatic control valve, according to the change of the load on the truss body, the air pressure and the water level in each first anti-pressure tank and the sporadic anti-pressure tank, the state regulation between every first anti-pressure tank and the sporadic anti-pressure tank and the buoyancy equilibrium regulation of the truss body are realized.

14. A method for adjusting the buoyancy of the universal offshore platform according to claim 4, wherein the method comprises the following steps:
storing water in the first anti-pressure tank of each of the first single floating bodies, connecting the first anti-pressure tanks with each other through the high-pressure water pipe, charging high-pressure air from the high-pressure air source into the first anti-pressure tank through the high-pressure air pipe and balancing mutual pressure to enable respective first anti-pressure tanks store the same amount of water, thereby balancing the buoyancy;
using the sporadic floating body as a water storage tank when the number of the first single floating bodies fixed on the underwater layer remains constant, introducing water from the first anti-pressure tank into the water storage tank, lowering the water storage tank gradually into water to obtain buoyancy to balance a gravity of the water storage tank with increasing of water yield entering into the water storage tank, thereby providing the platform with an increased buoyancy; introducing the water in the water storage tank into the first anti-pressure tank when pressuring the water in the water storage tank into the low-pressure water pipe by using high-pressure air and reducing power generation of a turbine generator; gradually lifting the water storage tank to the overwater surface with gradually decreasing of water in the water storage tank, thereby providing the offshore platform with a reduced buoyancy;
using the sporadic floating bodies as added first single floating bodies when the number of the first single floating bodies fixed in the underwater layer is changed, storing water in the added first single floating bodies, lowering the added first single floating bodies to the underwater layer and to the same level with the first single floating bodies, and fixedly connecting the added first single floating bodies in the same way with the first single floating bodies, introducing the high-pressure air to added first anti-pressure tanks of the added first single floating bodies to decrease water quantity, and stopping introducing the high-pressure air when required buoyancy of the added first anti-pressure tanks is achieved, adjusting the air pressure of the added first anti-pressure tanks to be balanced with the air pressure of each of the first anti-pressure tanks, and communicating respective added first anti-pressure tanks with respective first anti-pressure tanks, thereby providing the platform with an increased buoyancy; when the connection of selected first single floating bodies with the underwater layer is relieved by reducing the pressure and adding with water to make the selected first single floating bodies serve as the water storage tank, introducing high-pressure air to pressurize the water in the water storage tank into the low-pressure water pipe until the tank body is lifted to the overwater layer and becomes the sporadic single floating body, thereby providing the offshore platform with a decreased buoyancy.

15. A stable power generation method of the universal offshore platform according to claim 4, wherein the stable power generation method comprises the following steps: determining a minimum output pressure value of the vibration damping structure by setting the pressure value of high-pressure air in the first floating body component and the high-pressure air pipe, controlling and maintaining the stability of the high-pressure air pressure in the high-pressure air pipe and the first floating body component; turning on hydraulic generators or air expansion generators/screw expansion generators in a corresponding amount and with a corresponding power based on the water flow pumped to the high-pressure water pipe by the vibration damping structure or the air flow pumped to the high-pressure air pipe by the vibration damping structure, matching the water flow or air flow for generating electricity with the water flow or air flow pressed by the vibration damping structure, ensuring the balance of water circulation flow of the high-pressure water pipe and the low-pressure water pipe, and ensuring that the high-pressure air pressure in the first floating body component and the high-pressure air pipe is stable at the set value.

\* \* \* \* \*